United States Patent [19]

Kumar et al.

[11] Patent Number: 6,151,547

[45] Date of Patent: Nov. 21, 2000

[54] AIR/FUEL RATIO MANIPULATION CODE FOR OPTIMIZING DYNAMIC EMISSIONS

[75] Inventors: Sanath V. Kumar, Piscataway; Frank C. Briden, Morristown, both of N.J.

[73] Assignee: Engelhard Corporation, Iselin, N.J.

[21] Appl. No.: 09/257,550

[22] Filed: Feb. 24, 1999

[51] Int. Cl.$^7$ .............................. F01N 3/20; G06F 15/18
[52] U.S. Cl. .................... 701/101; 701/104; 701/115; 60/276; 60/274
[58] Field of Search .................... 701/101, 102, 701/103, 104, 109, 114, 115; 73/23.32, 117.3; 60/274, 276, 299, 300, 301

[56] References Cited

U.S. PATENT DOCUMENTS

| | | | |
|---|---|---|---|
| 4,189,404 | 2/1980 | Keith et al. | 502/304 |
| 4,300,205 | 11/1981 | Tansuwan | 703/8 |
| 4,438,497 | 3/1984 | Willis et al. | 701/105 |
| 4,624,940 | 11/1986 | Wan et al. | 502/251 |
| 4,714,694 | 12/1987 | Wan et al. | 502/304 |
| 4,727,052 | 2/1988 | Wan et al. | 502/327 |
| 5,057,483 | 10/1991 | Wan | 502/304 |
| 5,214,582 | 5/1993 | Gray | 701/33 |
| 5,261,366 | 11/1993 | Regueiro | 123/299 |
| 5,396,620 | 3/1995 | Burghart et al. | 714/6 |
| 5,396,794 | 3/1995 | Nichols | 73/118.1 |
| 5,426,585 | 6/1995 | Stepper et al. | 701/101 |
| 5,473,540 | 12/1995 | Schmitz | 701/1 |
| 5,522,250 | 6/1996 | Gee et al. | 73/1.07 |
| 5,535,620 | 7/1996 | Nichols | 73/118.1 |
| 5,638,272 | 6/1997 | Minowa et al. | 701/115 |
| 5,682,317 | 10/1997 | Keeler et al. | 701/101 |
| 5,703,777 | 12/1997 | Buchhop et al. | 701/109 |
| 5,724,242 | 3/1998 | Moore-McKee et al. | 701/114 |
| 5,750,886 | 5/1998 | Lambert et al. | 701/101 |
| 5,835,974 | 11/1998 | Nagy | 73/1.06 |
| 5,938,716 | 8/1999 | Shutty et al. | 701/115 |

FOREIGN PATENT DOCUMENTS

| | | |
|---|---|---|
| WO 95/00235 | 1/1995 | WIPO . |
| WO 95/35152 | 12/1995 | WIPO . |
| WO 96/17671 | 6/1996 | WIPO . |

OTHER PUBLICATIONS

40 CFR Ch. I (Jul. 1, 1998 Edition) § 86.111–90. pp. 404–406—Exhaust Gas Analytical System.

*Primary Examiner*—Willis R. Wolfe
*Attorney, Agent, or Firm*—Richard A. Negin

[57] ABSTRACT

A system for interfacing with the ECU of an automotive vehicle for optimizing engine control to meet emission requirements or engineering targets for catalytic converter systems includes a secondary controller and an emission analyzer. The secondary controller monitors sensor input to the ECU and actuator output from the ECU so as to mimic an ECU actuator control function by generation of an operating parameter control map(s) functionally identical to that used by the ECU. The emission analyzer receives vehicle sensor input and additional emission data from a bench gas analyzer to similarly produce not only the parameter control map but also emission maps correlated to the operating parameter control map which are systemically changed to optimize emission conversion by the vehicle's catalytic converter system and modify the operating parameter control map. The modified control map is inputted to the secondary controller which bypasses the ECU to control the actuator function in accordance with the modified control map. Emission maps are subsequently generated and the modified control map further modified until conversion of emissions by the vehicle's catalytic converter system is optimized. The system permits engine control to assure emission regulation compliance without knowledge of the ECU's code while also providing design optimization of the catalytic converter.

39 Claims, 11 Drawing Sheets

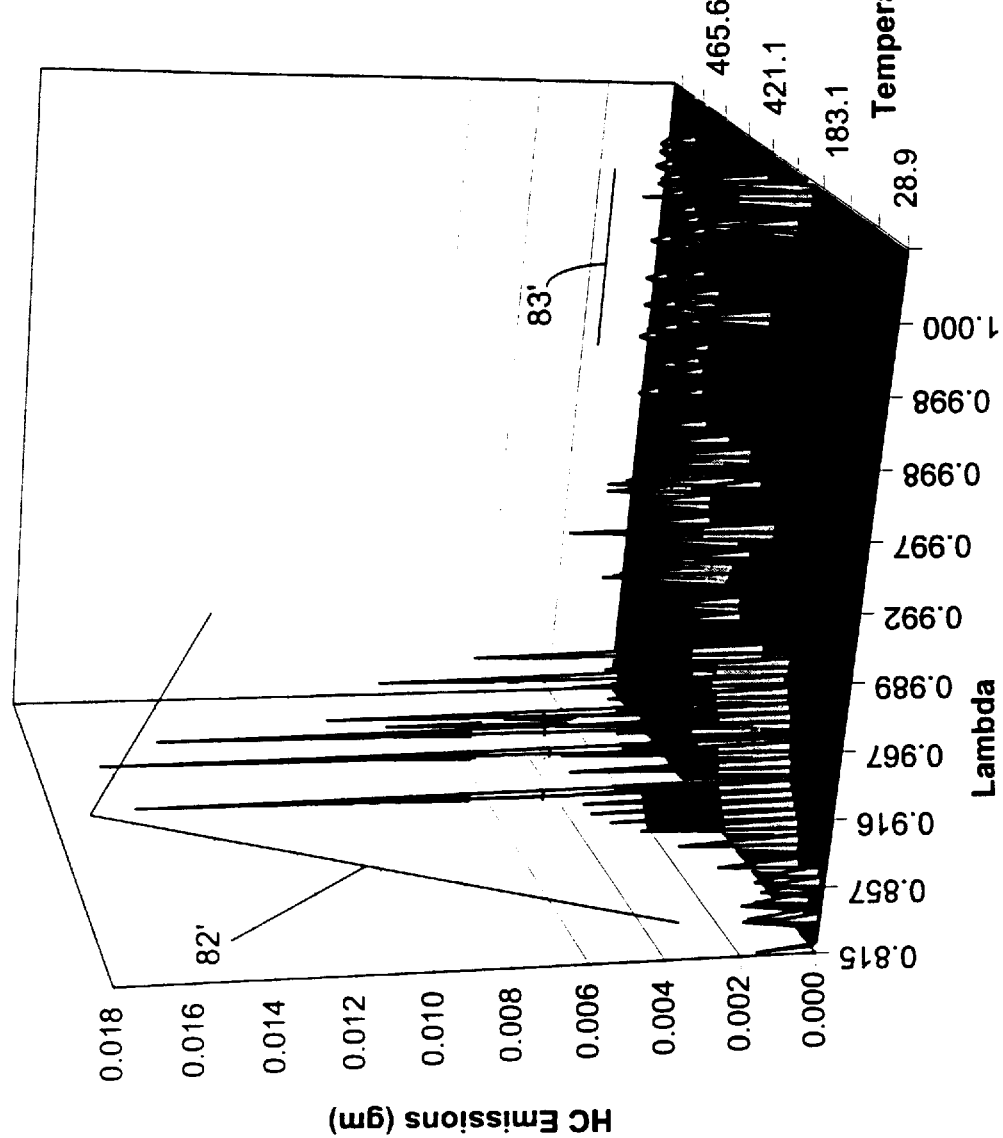

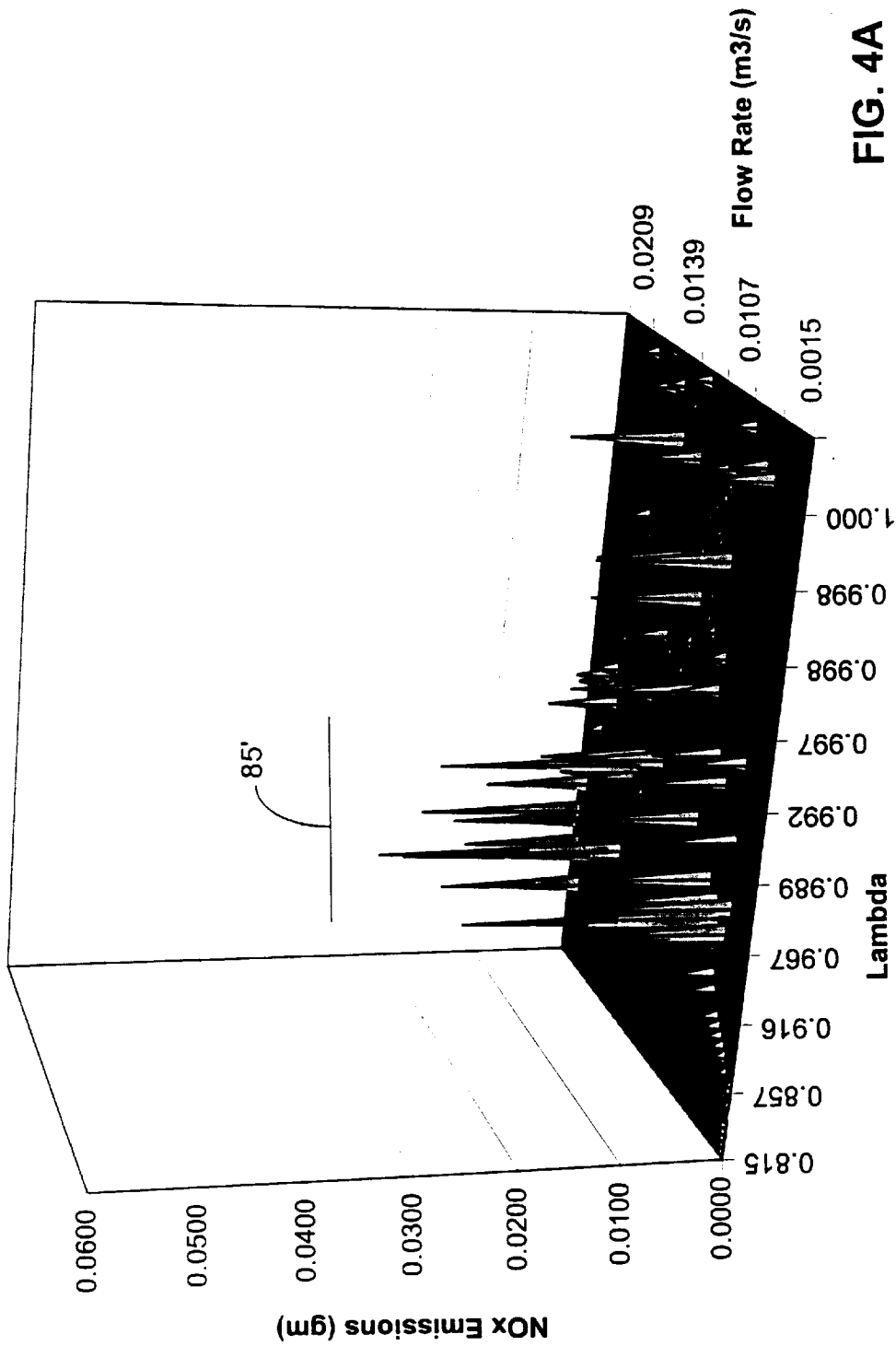

AIR/FUEL RATIO MANIPULATION CODE FOR OPTIMIZING DYNAMIC EMISSIONS

This invention relates generally to automotive exhaust gas emissions and more particularly to a system for controlling the engine to permit optimum usage of a catalytic converter for meeting emissions requirements.

The invention is particularly applicable to and will be described with specific reference to a system controlling in conjunction with the vehicle's electronic control unit the optimal operation of a gasoline powered or other alternative fuel powered engine so that the emissions of the engine in combination with the catalytic converter system meet emission standards. The invention has can be used with diesel engines as well as engines powered by gaseous or vaporized fuels.

INCORPORATION BY REFERENCE

The following patents are incorporated herein by reference and made a part hereof so that concepts, principles and components known in the art need not be described herein in detail. The patents incorporated herein by reference do not, per se, form the invention.

1) U.S. Pat. No. 4,438,497 to Willis et al., issued Mar. 20, 1984, entitled "ADAPTIVE STRATEGY TO CONTROL INTERNAL COMBUSTION ENGINE";
2) U.S. Pat. No. 5,214,582 to Gray, issued May 25, 1993, entitled "INTERACTIVE DIAGNOSTIC SYSTEM FOR AN AUTOMOTIVE VEHICLE, AND METHOD";
3) U.S. Pat. No. 5,396,794 to Nichols, issued Mar. 14, 1995, entitled "ENGINE CATALYZATION SYSTEM AND METHOD FOR AGING CATALYST";
4) U.S. Pat. No. 5,535,620 to Nichols, issued Jul. 16, 1996, entitled "ENGINE MANAGEMENT SYSTEM"; and,
5) U.S. Pat. No. 5,835,974 to Nagy, issued Nov. 10, 1998, entitled "METHOD AND MEANS FOR BLENDED MULTI-COMPONENT GAS CALIBRATION AND DIAGNOSIS OF MULTIPLE GAS ANALYZERS".

BACKGROUND

Vehicles equipped with internal combustion engines are fitted with catalytic converter systems which convert certain products of combustion of the engine such as HC, CO, $NO_x$, into emissions which are not considered noxious such as $CO_2$, $H_2O$, and $N_2$. Legislation (federal, state and foreign) increasingly limits the amount of noxious emissions which can be emitted to the atmosphere. Typically, the legislation imposes a specified limit of noxious emissions which can be discharged to the atmosphere during the time any given vehicle is operated at a specified or regulated drive cycle such as an FTP (Federal Test Protocol), US06 (High speed, heigh acceleration portion of the Supplemental Federal Test Procedure), SC03 (Air conditioner operation mode of the Supplemental Federal Test Procedure), European MVEG-A drive cycle etc. The drive cycles include or will include a "cold-start" segment which typically contributes a significant portion of the total noxious emissions discharged to atmosphere during the entire drive cycle. How the engine is operated determines to a large extent the make-up of the products of combustion and specifically, the generation of the regulated emissions by the engine which must be converted by the catalytic converter.

The engine and other vehicular functions are under the control of an electronic controller referred to as an engine control module (ECM) or an engine control unit (ECU) which is now a very sophisticated, dedicated microprocessor (s). The ECU receives a number of input signals from a variety of sensors and causes the generation of a number of output signals sent to various actuators on the engine and vehicle for controlling engine and vehicle functions. Insofar as the invention is concerned, the ECU will generate a signal to the engine's fuel injectors controlling the pulse width of the injector, i.e., the pressure, timing, rate and duration of injection, which is matched with the air (flow and pressure) that is mixed with the fuel to produce a combustible mixture, i.e., see U.S. Pat. No. 5,261,366 to Regueiro issued Nov. 16, 1993 for a discussion of various injector pulse techniques. In addition, the vehicle is typically equipped with a TWC catalyst (3-way catalyst converting $NO_x$, CO, and HC) and the air to fuel ratio (A/F) will cycle under ECU command at fixed perturbations from one A/F condition to another A/F condition. Typically, the A/F ratio will cycle about stoichiometric from a rich to a lean condition (although lean burn technology will cycle the A/F ratio from a lean to a less lean condition). In some newer, state-of-the-art vehicles, the A/F ratio might be held constant at stoichiometric condition or other suitable A/F ratio value, without any perturbations. In addition, the ECU will control spark timing through a spark module (and the valve timing, if the vehicle is equipped with variable valve timing). The ECU is programmed, closed loop (although open loop with respect to emission sensor feedback during cold-start), to generate actuator signals to the injector and to the engine timing module to produce an engine operation which assures vehicle driveability while producing products of combustion having compositions such that noxious emissions in the products of combustion can be converted by the catalytic converter to meet emission regulations and/or engineering targets.

The ECU is calibrated by the manufacturer generating look-up tables or maps while performing specified drive cycles during which emission data is obtained, i.e., See 40 CFR chapter 1, sections 86 et al. Reference can be had to U.S. Pat. No. 5,835,974 to Nagy for a description of a method to calibrate a bench gas analyzer suitable for collecting emission data in conformance with CFR emission analysis procedures. The look-up tables establish spark advance, valve timing, air/fuel ratio and EGR (Exhaust Gas Recirculation) settings for various engine speed/torque conditions occurring during the drive cycle. See for example, the calibration procedures set forth in U.S. Pat. No. 4,438, 497 to Willis et al. The maps or look-up tables generate a code programmed by the ECU which is specific and unique to each engine for a given vehicle platform. Each manufacturer has its own proprietary ECU and within each manufacturer there are literally hundreds of unique and specific ECU calibrations. See U.S. Pat. No. 5,473,540 to Schmitz issued Dec. 5, 1995 proposing a generic ECU having ability to be programmed for any specific vehicle through a separate memory module. In addition, the automotive manufacturers are moving away from part suppliers in favor of suppliers who can furnish complete systems for drop-in assembly in the vehicle. In-so-far as the present invention is concerned, a supplier will furnish the entire catalytic converter system suitable for a specific vehicular platform produced by the automobile manufacturer as opposed to a supplier furnishing a catalytic converter for use in a catalytic converter system which the automobile manufacturer designs and mates with a specific engine in a specific vehicle. However, the ECU code and ECU details are proprietary and generally, not available to third party suppliers.

Within the prior art it is known to send false input signals to the ECU to simulate an aged condition such as an aged EGO sensor as shown in U.S. Pat. No. 5,522,250 to Gee et al. so that the ECU can be calibrated. On somewhat similar lines, U.S. Pat. No. 4,300,205 to Tansuwan shows a simulated controller capable of feeding false input signals to the ECU and also generating false output signals to certain output devices thus bypassing the ECU. In the '205 patent, the object is to test, calibrate and improve the speed control for any engine. In the interactive diagnostic area, U.S. Pat. No. 5,214,582 to Gray shows a modified break out box with bypass connections taking over control of selected sensors and actuators so that testing diagnosis of the sensors and actuators can be performed. In the '582 patent, simulated sensor and actuator signals are inputted from an external computer.

U.S. Pat. No. 5,396,794 to Nichols is somewhat similar to the '582 patent in that a break out box is used to bypass certain inputs and outputs of the ECU while allowing the ECU to function normally for processing signals which are not bypassed. The '794 patent periodically establishes ECU control to avoid a shut down mode and uses a CPU to control the bypass functions. In the '794 patent, the bypass system is disclosed for purposes of aging the catalytic converter by changing the injector's pulse width to produce excessive emissions which prematurely age the catalyst. The '794 patent is improved in U.S. Pat. No. 5,535,620 to Nichols in that ignition timing as well as the injectors can be separately and independently controlled irrespective of the ECU and without knowledge of the ECU's operating code. The object of the '620 patent is the provision of a programmable engine tool for conducting combustion research or emission control research ( i.e., as explained in the '794 patent for catalytic converter aging), and as a diagnostic for the testing of the sensors and actuators. The Nichols patents, perhaps in a somewhat simpler form, and to some extent the Gray patent, are utilized in the present invention and are thus incorporated by reference herein Until the present invention, a system did not exist which allowed a third party supplier without detailed knowledge of the operating code and details of the ECU to dynamically control the engine throughout its operating range such that a catalytic converter system could be specifically designed and mated with any engine to positively assure compliance with emission regulations and/or engineering targets.

SUMMARY OF THE INVENTION

It is thus a principle object of the invention to provide a system or method for use in controlling an internal combustion engine which establishes a dynamic engine operating code assuring compliance with emission regulations and/or engineering targets without knowledge of the vehicle's ECU code and/or the operating details of the ECU.

This object along with other features and advantages of the invention is achieved in a method for optimizing the code of a vehicular ECU to meet vehicular emission regulations and/or engineering targets comprising the steps of: a) generating an A/F ratio map of the A/F actuator signals outputted by said ECU correlated to at least one operating parameter signal inputted to said ECU when and as the vehicle replicates a specific drive cycle; b) training a second controller to selectively generate the A/F actuator signals of the ECU by initially monitoring and then mimicking the ECU's generation of said A/F actuator signals; c) during the drive cycle, measuring emissions in the vehicle's exhaust gases before and after the catalytic converter by vehicle sensors and exhaust gas sensors to determine in a bench analyzer specific emissions and total emissions generated at specific intervals in the drive cycle;. d) modifying the A/F ratio map to reduce the emissions detected in step c; e) repeating the drive cycle with A/F actuator signals generated by the modified A/F ratio map inputted to the engine by the second controller with the ECU A/F actuator signals bypassed; and, f) sequentially repeating steps c, d and e until the vehicle meets emissions regulations and/or design targets whereby an optimized A/F ratio code is developed for use by the ECU without knowledge of the ECU's operating code or programming details thereof.

In accordance with another feature of the invention, the method is extended to account for the EGR impact on emissions produced by the vehicle during the drive cycle. The method steps described with reference to optimizing the A/F ratio are applied to the EGR settings in that a map of the EGR (exhaust gas recirculation) input to the engine correlated to at least one engine operating parameter is generated and the emissions produced during the drive cycle, specifically the $NO_x$ emissions, are analyzed and the EGR map modified to reduce the emissions. The inventive system can be applied to an analysis and emission optimization based on modified EGR settings, per se, or in combination with the modified A/F ratio settings.

In accordance with yet another aspect of the invention, the method is further extended to account for the timing impact, specifically the spark timing, on the emissions produced by the vehicle during the drive cycle. The method steps described with reference to optimizing the A/F ratio and the EGR metering are applied to the engine timing settings in that a map of the spark timing inputted to the engine correlated to at least one engine operating parameter is generated and the emissions produced during the drive cycle, specifically the emissions produced during the cold start segment of the drive cycle, are analyzed and the timing map modified to reduce the emissions. More particularly, since the cold start control of the engine is open loop, several operating parameters including ambient, air and engine temperatures as well as air mass flow are mapped. The inventive system can be applied to an analysis and emission optimization based on cold start, timing settings, per se, or in combination with the methods described for varying A/F ratio settings and/or EGR settings.

In accordance with yet another feature of the invention, the exhaust gas sensors used in the inventive system include one or more sensors selected from the group consisting of i) flame ionization detectors; ii) light absorption detectors including non-dispersive infrared detectors; iii) calorimetric sensors; iv) electron capture detectors; v) mass spectrometers; vi) Fourier Transform Infrared (FTIR) analyzers; vii) electrolytic sensors; and viii) electromagnetic sensors whereby emission measurements which are more precise and/or more specific to emission constituents than conventional bench calibration analyzers resulting in a more precise emission optimization.

In accordance with a specific and important feature of the invention, the method further includes performing one or more steps on the catalytic converter following step (e) selected from a group of steps consisting of i) changing the concentration of the precious metals in the washcoat of the catalytic converter; ii) changing the oxygen storage materials or concentrations thereof; iii) changing the promoters or concentrations thereof; iv) changing the stabilizers or concentrations thereof; and v) changing the size of the catalytic converter or the density of the gas passages therein or the geometric configuration of the gas passages whereby the design criteria for the emission levels are met with a specific vehicle/calibration/catalytic converter combination and the cost of the total emission system is minimized.

In accordance with the scope of one particular aspect of the invention, a method for achieving targeted concentrations of tailpipe emissions produced by an internal combustion engine equipped with one or more catalytic converters and an ECU for controlling the operation of the engine is provided which includes the steps of:

a) providing i) a secondary controller for developing actuator signals for controlling a specific engine operation affecting emissions generated by the engine instead of the ECU, ii) an emission analyzer for generating control instructions inputted to the secondary controller which the secondary controller uses to develop the actuator signals, and iii) a bench gas analyzer for analyzing selected engine and tailpipe emission components which is inputted to the emission analyzer;

b) monitoring selected vehicle sensor signals generated by the vehicle during a specified drive cycle which affect the actuator signals to generate a control map having a control parameter correlated to a number of sensed engine operating conditions with the secondary controller additionally generating actuator signals for the range of control parameters recorded in the control map to replicate the ECU actuator signals whereby the secondary controller is able to interpolate the control map and duplicate the ECU actuator signals;

c) generating at least one emissions map by the emissions analyzer from emission data collected from the vehicle's sensors including emission sensors and the bench gas analyzer including bench emission sensors with the emissions map correlating the emissions with at least one engine operating parameter and the control parameter used in generating the control map;

d) modifying the control parameter values for those engine operating parameter values which produced maximum emissions in the emission map, to reduce total emissions;

e) changing the control parameter in the control map to the values set in the modified emission map;

f) inputting the modified control map to the secondary controller and repeating the drive cycle under control of secondary controller; and g) repeating steps c, d, e and f until emissions generated by the engine have reached desired levels.

In accordance with another aspect of the invention, there is provided a system for achieving targeted tailpipe emissions produced by an internal combustion engine having a catalytic converter system and an ECU for controlling the operation of the engine which includes a) a secondary controller for selectively controlling at least one engine operation in place of the ECU controlling the one engine operation, the ECU continuing to control all other engine operations; the secondary controller including i) a routine for monitoring vehicular sensor input signals and actuator signals generated by the ECU when controlling the one engine operation in response to the vehicular sensor input signals, ii) a routine to generate a control map from data acquired from the monitoring routine which at any given time during a drive cycle correlates a control parameter for controlling the one engine operation in response to at least one selected vehicle sensor indicating a sensed operating condition of the engine, iii) a routine for generating an actuator signal controlling the one engine operation with the control parameter and iv) a routine for modifying the control map in response to instructions from an outside source;

b) a bench gas analyzer having a plurality of gas sensors for sensing specific emission compounds in the engine and tailpipe exhaust and including timing arrangement associated with the bench gas analyzer for correlating sensed emission compounds in the exhaust gas with specific drive cycle intervals as well as total emissions sensed during the drive cycle; and c) an emissions analyzer including a CPU and associated memory receiving vehicle sensor input signals and bench gas analyzer signals and generating map modification instructions to the secondary controller, the emissions analyzer including i) a routine to monitor the vehicle sensor signals to generate the control map; ii)a routine to generate at least one emission map from vehicle emission sensor data and bench gas analyzer data which at any given time during a drive cycle correlates sensed vehicle emissions with the control parameter and the at least one selected operating condition sensed by a vehicle sensor; iii) a routine to modify the control parameter in the control map at selected operating conditions where emissions recorded on the emission map exceed a set limit; and iv) a routine to input the modified control parameter map as instructions to the secondary controller.

It is thus another object of the invention to provide a system or method which evaluates the dynamic performance of an internal combustion engine such that an optimally designed catalytic converter system or exhaust treatment system for the internal combustion engine can be provided.

Yet another object of the invention is to provide a method for analyzing and controlling the operation of an internal combustion engine in combination with a method for designing a catalytic converter system for the internal combustion engine whereby the emissions produced by the engine meet governmental regulations with a cost efficient catalytic converter system.

Still yet another object of the invention is to provide a system which permits user control of the operation of an internal combustion to produce look-up tables or calibration maps for any ECU in any specific engine/vehicular platform which assures that the catalytic converter system used in that engine/vehicular platform meets emission requirements.

Yet another object of the invention is to provide a system which permits precise control of an internal combustion engine without knowledge of the engine's ECU so that so that engine emissions can be dynamically evaluated for design of catalytic converter systems to meet not only current emission standards but also anticipated regulations covering emission compounds not currently regulated.

These and other features, advantages and objects of the invention will become apparent to those skilled in the art upon reading and understanding the Detailed Description of the invention set forth below taken in conjunction with the drawings.

BRIEF DESCRIPTION OF THE DRAWINGS

The invention may take form in certain parts and an arrangement of parts, taken together in conjunction with the attached drawings which form a part of the invention and wherein:

FIG. 3A is a constructed map of optimized tailpipe HC emissions plotted as a function of the vehicle's exhaust gas temperature and lambda (A/F ratio) taken over a portion of a regulated drive cycle;

FIG. 4A is a constructed map of optimized tailpipe NOx emissions plotted as a function of vehicle's exhaust gas flow rate and lambda (A/F ratio) taken over a portion of a regulated drive cycle;

DETAILED DESCRIPTION OF THE INVENTION

Figure 1:
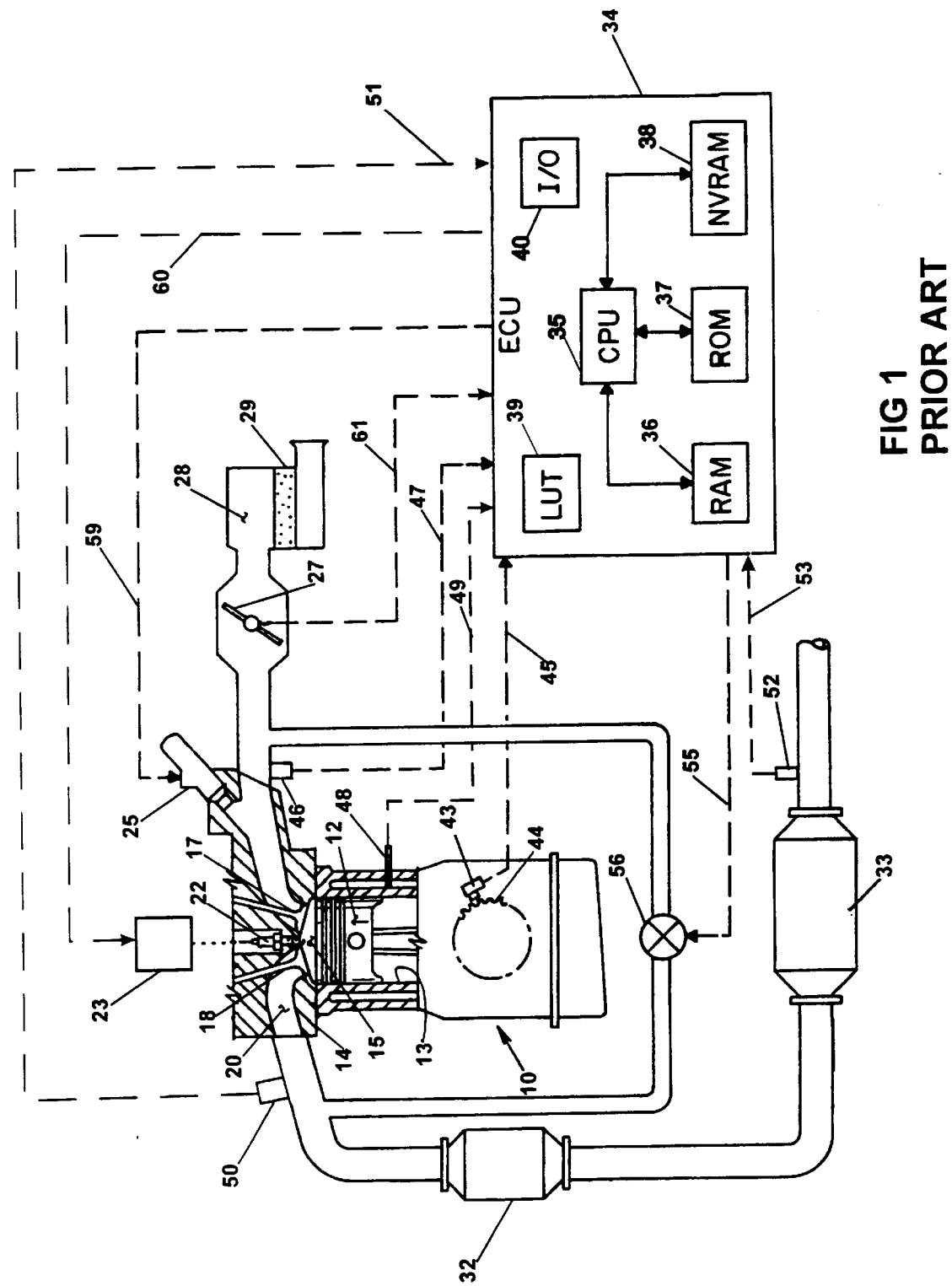
FIG. 1 is a schematic and diagrammatic view of the components of an internal combustion engine and the control thereof and is prior art.

Referring now to the drawings wherein the showings are for the purpose of illustrating a preferred and alternative embodiments of the invention only and are not for the purpose of limiting the invention, there is shown in FIG. 1 a gasoline powered, internal combustion engine 10.

A. Conventional Production Control System

Engine 10 has one or more pistons 12 within a cylinder 13 which, in combination with the cylinder head 14, forms a combustion chamber 15. An intake valve 17 controls admission of fuel and air into combustion chamber 15 and an exhaust valve 18 controls the exhaust of products of combustion to an exhaust manifold 20. A spark plug 22 shown under control of a spark module 23 ignites the air-to-fuel mixture within combustion chamber 15 to produce products of combustion or exhaust gases or gaseous emissions vented through exhaust valve 18 to exhaust manifold 20.

A fuel injector 25 and an air throttle plate 26 control the fuel/air mixture admitted to combustion chamber 15 through an intake passageway 28, in turn, connected to atmosphere through an air cleaner 29. Engine 10 is described only in its conventional, functional terms. For example, fuel injector 25 pulses metered quantities of fuel to combustion chamber 15 during each combustion cycle of engine 10. The time and rate at which injector 25 meters the fuel is typically referred to as the injector's pulse width and the quantity of fuel metered during the pulse is typically varied depending upon the manufacturer. For example, the fuel could be metered slowly upon actuation of fuel injector 25, build to a maximum value at some point in the pulse width and then diminish before fuel injector 25 closes. As used in this Description pulse width includes not only the duration of the pulse (and how the pulse may be varied during the duration it is on)but also the time at which the pulses are generated. Those skilled in the art understand how engine components work and they will not be described in detail herein since the invention contemplates application, in the preferred embodiment, to all typical engines and detailed explanations are not necessary for an understanding of the invention.

An exhaust gas recirculation loop, EGR 30, is provided for admitting a portion of the exhaust gas into intake passageway 28 for mixing with the fuel/air mixture injected to combustion chamber 15. Engine 10 is equipped with a catalytic converter exhaust system which, for purposes of discussing the inventive concepts, is shown to include a light-off or close coupled catalytic converter 32 adjacent exhaust manifold 20 and a three-way catalytic converter, TWC 33, downstream of light-off catalytic converter 32.

It is to be understood that the system and method of the present invention can generally be used with exhaust treatment systems which typically include catalytic converter systems which typically have one or more catalytic converters or catalyst treated elements contained therein. For definitional purposes only and as used in the description of the invention and in the claims herein, "catalytic converter system" as used herein means any exhaust treatment system and "catalytic converter" means any device treated with a catalysts) such as but not limited to TWC 33, or catalysts to treat exhaust emissions from diesel oil fueled engines. Typical catalytic converter systems such as that described herein comprise a catalyst composition coated on a ceramic or metallic honeycomb. It is recognized that the system and method of the present invention can be also be used with exhaust systems that comprises other catalytic elements such as pipe converters, having a catalyzed unit such as a metallic honeycomb, located in the exhaust pipe, tailpipe catalysts which are catalyst units located downstream of the muffler and typically up to three feet of the tailpipe outlet.

The present inventions can be used with catalytic converter systems which comprise a variety of other elements used in place of or in combination with conventional catalytic converters in the exhaust system. Such elements can include a variety of sensors including but not limited to oxygen sensors, hydrocarbon sensors, thermal sensors and flow rate sensors other than those shown in FIG. 1. Such elements can further include a variety of means to provide additives to the exhaust systems such as air, oxygen, inert gases such as nitrogen, reductants such as hydrocarbons from the engine or from a separate hydrocarbon source (e.g. fuel), ammonia and urea. Furthermore, the elements can further include particulate filters such as used in diesel exhaust systems with typical filter including but not limited to wall flow honeycomb, catalyzed wall flow honeycombs, gauzes and catalyzed gauzes. Yet other elements can include adsorber units as part of the catalytic converter element or in separate units. Useful adsorbers include hydrocarbon adsorbers such as zeolite compounds, nitrogen oxide adsorbers such as alkaline earth metal compounds with barium oxide being particularly useful, and sulfur compound adsorbers such as basic oxygenated metal compounds such as metal oxide, metal carbonate, metal hydroxide or mixed metal oxide with strontium oxide being particularly useful. Additional elements include heat exchangers such as cross-flow heat exchangers, heated units such as electrically heated units where the heat exchange units can be used with or without catalytic coatings. Useful heat exchangers can be cross flow ceramic honeycombs. Useful electrically heated units include flow through metal honeycomb. The heat exchangers and electrically heated units can be used without catalysts or can be catalyzed. Such catalyzed units typically have at least part of their surfaces coated with catalyst compositions. The composition can be TWC or diesel oxidation catalyst coatings.

The system and method of the present invention is preferably used with catalytic converter system (exhaust treatment systems) to treat the exhaust gases from engines in mobile applications including gasoline engine and diesel engine exhaust. The system and method of the present invention can be used in a variety of mobile applications using different types and sizes of engines such as passenger automobile gasoline and diesel engines, on and off of the road trucks, heavy duty equipment engines, and small engines such as moped, motorcycles, scooter and snow mobile engines.

Engine 10 is conventionally under the control of an electronic control module or electronic control unit (controller or computer) conventionally referred to as either an ECM or ECU but herein referred to as ECU 34. ECU 34 is conventional and includes well known elements such as a central processing unit or CPU 35, RAM (Random Access Memory) 36, ROM (Read Only Memory) 37, and NVRAM (Non-Volatile Random Access Memory) 38. Also shown is a look-up table LUT 39 separate and apart from ROM 37 (or alternatively, included as a component of ROM 37). Also shown is a conventional input/output (I/O) unit 40 for receiving and transmitting instructions from and to ECU 34. Communication between ECM 34 and actuation units on the vehicle, including sensors associated therewith, is typically carried out by analog signals from the sensor digitized at the periphery of ECM 34 (by an appropriate A/D converter and an appropriate D/A converter sending back analog signals to actuation units), not shown. ECM 34 operates in a well known manner to control engine 10 and process engine control and diagnostic routines, such as stored by step-by-step instructions in ROM 37. As is well known, engineering operating parameters are read into ECM 34 as input signals which are then processed into output signals or control signals outputted from ECM 34 to actuators on the vehicle controlling vehicular operation, specifically, operation of engine 10. Insofar as the general operative concepts of the present invention is concerned, input signals are read into ECM 34, processed by RAM 36 and NVRAM 38 under the control of CPU 35 from algorithm routines stored in ROM 37. Data stored in memory including LUT 39 is then accessed by RAM 36 and NVRAM 38 through algorithms stored in ROM 37 under the control of CPU 35 to generate signals outputted by I/O unit 40 and/or the D/A and A/D peripheral converters as signals to the actuators on engine 10 while the signals outputted could be stored as codes, for example, in NVRAM 38.

There are a number of sensors which generate engine operating information that is inputted to ECU 34 and used to control operation of engine 10. Several sensors are diagrammatically illustrated in FIG. 1 and include a timing pick-up unit 43 shown sensing rotation of engine flywheel 44 and generating a timing signal on dash-line 45 to ECM 34. The input signal on timing signal line 45 can be viewed as an input sensor signal generating vehicular speed information, timing information whether for spark, fuel, or valve, or engine torque information. Additionally, an air flow sensor 46 senses mass air flow in intake passage 28 and generates an input signal on air sensor dash-line 47 to ECM 34. Air signal line 47 can also be viewed as carrying sensor information for manifold air pressure. Also a thermometer 48 senses engine temperature and generates an input signal on temperature sensor dash-line 49 to ECU 34 which can also be viewed as carrying sensor information indicative of ambient temperature and/or exhaust gas temperature and/or catalytic converter temperature as well as engine temperature. Importantly, there are one or more emission sensors in the catalytic converter exhaust system which generate an input signal to ECU 34 indicative, directly or indirectly, of the emissions exhausted to atmosphere. The sensors applied to the vehicle, generally, are either calorimetric sensors directly measuring the HC content of the gas or oxygen sensors, EGO, indirectly determining emissions generated by the vehicle.

Two types of EGOs are typically employed, either a heated EGO (HEGO) or a universal EGO (UEGO). A HEGO provides a high voltage signal (typically ~800 mV) when the mixture is rich and a low voltage signal (typically ~100 mV) when the mixture is lean. Upon the gas mixture composition crossing stoichiometry, the HEGO signal quickly switches between the high and low voltage outputs. Hence, the sensors are commonly known as "switching sensors". When the vehicle is equipped with a TWC catalyst, any number of control schemes are utilized in ECU 34 to correlate the frequency of the switched sensor signal with the frequency at which the A/F ratio is cycled about stoichiometric to indirectly determine the efficiency of the catalytic converter by its ability to retain and release oxygen as the A/F ratio cycles from rich to lean. The assumption is that the ability of the TWC to convert emissions is directly related to its ability to store and release oxygen which diminishes over time. By cycling the engine rich/lean at a known frequency a time relationship is established and measured by the switching HEGO sensor to determine TWC efficiency. A UEGO sensor, on the other hand, provides a voltage signal which directly correlates to the A/F ratio over a wide range of values (typically lambda~0.7 to ~32). UEGOs are commonly referred to as "wide range oxygen sensors".

Systems in use today conventionally use an exhaust gas oxygen sensor (EGO) upstream of the catalytic converter(s) and an EGO downstream of some portion of the catalytic converter(s). The upstream EGO functions as a feedback controller for engine fueling. Based upon the upstream EGO signal, the fuel injectors are controlled to provide the desired change in air-to-fuel ratio (AFR). The downstream EGO functions as described and also serves as a signal correction for the upstream EGO through a function referred to as "fuel trim" for an aged EGO. In FIG. 1, an upstream EGO, preferably a UEGO 50, is used to generate signals on sensor line 51 indicative of the A/F ratio produced by engine 10. A downstream EGO, preferably a HEGO 52, is used to generate signals on emission sensor line 53 indicative of the emissions exhausted to atmosphere through a switching algorithm employed in ECU 34. In the preferred embodiment disclosed herein, the engine control is assumed to cycle the A/F ratio about stoichiometric at some set frequency which is generally in the range of 2 to 3 Hz. Some systems however maintain the A/F ratio constant and some systems increase the perturbation frequency significantly so that the A/F ratio is essentially constant. The inventive system is applicable for optimizing all such control schemes. It is noted that almost all systems use UEGO sensor 50 to establish a signal for A/F ratio control.

A number of actuators are employed on the vehicle for engine control and invariably the actuators themselves develop feedback signals to insure their settings. Actuators under the control of ECM 34 include, but are not limited to, several which are diagrammatically shown in FIG. 1 under the control of output signals generated by ECM 34. The output signals include but are not limited to an EGR control signal on EGR control line 55 regulating operation of an EGR solenoid valve 56. Additional output signals include a fuel injector signal on fuel injector dash line 59, a spark timing signal on spark timing line 60 utilized by spark module 23 to develop a signal for firing spark plug 22, and an air throttle signal on air throttle dash line 61 which can be viewed as setting mass air flow and/or manifold air pressure in intake passageway 28.

B. The Catalytic Converter System

As noted, the system disclosed in FIG. 1 includes a close coupled catalytic converter 32 and a TWC converter 33.

Close-coupled catalyst 32, when used as part of the exhaust emission system, is a relatively recent development and reference should be had to U.S. patent application Ser. No. 08/350,297 (WO96/17671) hereby incorporated by reference herein for a more detailed explanation of close-coupled catalyst 32 and a system for use therewith than that which will be discussed herein.

Close-coupled catalysts have been designed to reduce hydrocarbon emissions from gasoline engines during cold starts. More particularly, the close-coupled catalyst is designed to reduce pollutants in automotive engine exhaust gas streams at temperatures as low as 350° C., preferably as low as 300° C. and more preferably as low as 200° C. The close-coupled catalyst of the present invention comprises a close-coupled catalyst composition which catalyzes low temperature reactions. This is indicated by the light-off temperature. The light-off temperature for a specific gaseous component is the temperature at which 50% of that component reacts.

Close-coupled catalyst 32 is placed close to engine 10 to enable it to reach reaction temperatures as soon as possible. However, during steady state operation of the engine, the proximity of the close-coupled catalyst to engine 10, typically less than two feet, more typically less than one foot and commonly attached directly to the outlet of exhaust manifold 20 exposes the close-coupled catalyst composition to exhaust gases at very high temperatures of up to 1100° C. The close-coupled catalyst in the catalyst bed is heated to high temperature by heat from both the hot exhaust gas and by heat generated by the combustion of hydrocarbons and carbon monoxide present in the exhaust gas. In addition to being very reactive at low temperatures, the close-coupled catalyst composition should be stable at high temperatures during the operating life of the engine. TWC 33 downstream of the close-coupled catalyst can be an underfloor catalyst or a downstream catalyst. Close-coupled catalyst 32 increases the gas temperature through conversion of HC and CO which, in turn, enables the downstream catalyst, typically the underfloor three-way catalyst, TWC 33, to run more effectively at a higher temperature. Sintering resistance and improved performance will result.

Close-coupled catalyst 32 preferably is in the form of a carrier supported catalyst where the carrier comprises a honeycomb type carrier. Essentially, close-coupled catalyst has substantially no cerium oxide and praseodymium oxide. More particularly, the catalyst composition includes a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components; and optionally a second zirconium oxide. Some close-coupled catalysts have also optionally included at least one rare earth oxide selected from the group consisting of neodymium oxide and lanthanum oxide. However, neither lanthanum or neodymium is necessary. More specifically, the preferred composition is from about 75 to 400 g/ft3 of the palladium components; from about 0.75 to about 2.02 g/in3 of activated alumina support; from about 0.05 g/in3 to about 0.4 g/in3 of strontium oxide; from about 0.05 to about 0.2 g/in3 of barium oxide; and from about 0.05 to about 0.5 g/in3 of the second zirconium oxide.

TWC 33 on the other hand contains oxygen storage components (OSC). Preferred catalysts and catalyst structures which contain oxygen storage components and which are used to convert hydrocarbons are disclosed in WO95/35152, WO95/00235 and WO96/17671 hereby incorporated by reference.

Preferred embodiments of the present invention are directed to a system for on board diagnostics (OBD) of a catalyst useful to treat motor vehicle engine exhaust. The catalyst can be in the form of a catalyst composition supported on a substrate such as a ceramic or metal monolith. The catalyst can be a coating on the substrate of one or more catalyst composition layers. Useful catalyst compositions can be in the form of one or more coatings. A preferred catalyst useful with the system of the present invention is a three-way conversion catalyst (TWC). The TWC catalyst composite of the present invention simultaneously catalyzes the oxidation of hydrocarbons and carbon monoxide and the reduction of nitrogen oxides in a gas stream.

Such compositions typically comprise a catalytically active component. A useful and preferred component is a precious metal, preferably a platinum group metal and a support for the precious metal. Preferred supports are refractory oxides such as alumina, silica, titania, and zirconia. A catalyst system useful with the method and apparatus of the present invention comprises at least one substrate comprising a catalyst composition located thereon. The composition comprises a catalytically active material, a support and preferably an oxygen storage component.

Useful catalytically active components include at least one of palladium, platinum, rhodium, ruthenium, and iridium components, with platinum, palladium and/or rhodium preferred. Precious metals are typically used in amounts of up to 400 g/ft$^3$, preferably 5 to 250 g/ft$^3$ and more preferably 25 to 200 g/ft$^3$ depending on the metal. Amounts of materials are based on weight divided by substrate (honeycomb) volume.

Useful supports can be made of a high surface area refractory oxide support. Useful high surface area supports include one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Desirably, the active alumina has a specific surface area of 60 to 300 m$^2$/g.

Preferred oxygen storage components have oxygen storage and release capabilities. The oxygen storage component is any such material known in the art, preferably at least one oxide of a metal selected from the group consisting of rare earth metals, and most preferably a cerium or praseodymium compound, with the most preferred oxygen storage component being cerium oxide (ceria). The oxygen storage component can be present at least 5 wt. % and preferably at least 10 wt. % and more preferably at least 15 wt. % of the catalyst composition. The oxygen storage component can be included by dispersing methods known in the art. Such methods can include impregnation onto the composition by impregnating the oxygen storage component onto the support such as a palladium containing support in the form of an aqueous solution, drying and calcining the resulted mixture in air to give a washcoat layer which contains an oxide of the oxygen storage component in intimate contact with the palladium component. Examples of water soluble or dispersible, decomposable oxygen storage components which can be used include, but are not limited to water soluble salts and/or colloidal dispersions of, cerium acetate, praseodymium acetate, cerium nitrate, praseodymium nitrate, etc. U.S. Pat. No. 4,189,404 discloses the impregnation of alumina-based support composition with cerium nitrate.

Alternatively, the oxygen storage component can be a bulk oxygen storage composition comprising an oxygen storage component which is preferably ceria, and/or praseodymia in bulk form. Ceria is most preferred. By bulk form it is meant that the ceria and/or praseodymia is present as discrete particles which may be as small as 1 to 15 microns in diameter or smaller, as opposed to having been dispersed in solution. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria dispersed within the alumina particles. Cerium oxide and praseodymium oxide are the most preferred oxygen storage components.

The performance of the catalyst composition can be enhanced by the use of an alkaline earth metal which is believed to act as a stabilizer, at least one rare earth metal component selected from lanthanum, praseodymium and neodymium which is believed to act as a promoter, and at least one zirconium component.

A useful and preferred catalyzed article can be a layered catalyst composite comprises a first (bottom) layer comprising a first layer composition and the second (top) layer comprising a second layer composition. Such articles are disclosed in WO95/00235.

Briefly, the first layer comprises a first platinum group metal component, which comprises a first palladium component, which can be the same or different than that in the second layer. For the first layer to result in higher temperature conversion efficiencies, an oxygen storage component is used in intimate contact with the platinum group metal. It is preferred to use an alkaline earth metal component believed to act as a stabilizer, a rare earth metal selected from lanthanum and neodymium metal components which is believed to act as a promoter, and a zirconium component. The second layer comprises a second palladium component and optionally, at least one second platinum group metal component other than palladium. Preferably the second layer additionally comprises a second zirconium component, at least one second alkaline earth metal component, and at least one second rare earth metal component selected from the group consisting of lanthanum metal components and neodymium metal components. Preferably, each layer contains a zirconium component, at least one of the alkaline earth metal components and the rare earth component. Most preferably, each layer includes both at least one alkaline earth metal component and at least one rare earth component. The first layer optionally further comprises a second oxygen storage composition which comprises a second oxygen storage component. The second oxygen storage component and/or the second oxygen storage composition are preferably in bulk form and also in intimate contact with the first platinum group metal component.

In a preferred embodiment the first layer can comprise a first palladium component and relatively minor amounts of a first platinum group metal other than palladium and/or the second layer can comprise a second palladium component and relatively minor amounts of a second platinum group metal component other than a palladium component. The preferred first and second platinum group components are selected from platinum, rhodium, and mixtures thereof. The preferred first platinum group metal component other than palladium is platinum and the most preferred second platinum group metal component other than palladium is selected from rhodium, platinum, and mixtures thereof. Typically the first layer will contain up to 100 percent by weight of palladium as the platinum group metal. Where a first platinum group metal component other than palladium is used, it is used typically in amounts up to 40 and preferably from 0.1 to 40, more preferably from 5 to 25 percent by weight based on the total weight of the first palladium component and the platinum group metal components other than palladium in the first layer. Where a second platinum group metal component other palladium is used, it is used typically in amounts up to 40 and preferably from 0.1 to 40, more preferably from 5 to 25 percent by weight based on the total weight of the second palladium component and the platinum group metal components other than palladium in the second layer.

The catalyst of this embodiment preferably comprises a palladium component present in each of the first and second layers, in the catalytically-active, promoting component in an amount sufficient to provide compositions having significantly enhanced catalytic activity due to the palladium component. In a preferred embodiment the first palladium component is the only platinum group metal component in the first layer, and the second palladium component is the only platinum group metal component in the second layer. Optionally either or both of the first and second layers can further respectively comprise a first and second useful platinum group metals include, for instance, platinum, ruthenium, iridium and rhodium, and mixtures or alloys of such metals, e.g., platinum-rhodium.

The first layer composition and second layer composition respectively comprise a first support and a second support which can be the same or different components. The support is made of a high surface area refractory oxide support as recited above. The first layer and second layer compositions preferably comprise a support such as alumina, catalytic components, stabilizers, reaction promoters and, if present, other modifiers and excludes the carrier or substrate. When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. For typical automotive exhaust gas catalytic converters, the catalyst composite which includes a monolithic substrate generally may comprise from about 0.50 to about 6.0, preferably about 1.0 to about 5.0 g/in$^3$ of catalytic composition coating.

The catalyst of the present invention preferably contains a first oxygen storage component, as recited above, in the first or bottom layer which is in intimate contact with a palladium component. The oxygen storage component is any such material known in the art and preferably at least one oxide of a metal selected from the group consisting of rare earth metals and most preferably a cerium or praseodymium compound with the most preferred oxygen storage component being cerium oxide (ceria). The oxygen storage component can be present at least 5 wt. % and preferably at least 10 wt. % and more preferably at least 15 wt. % of the first layer composition. In the composition of the first or bottom layer, the oxygen storage component can be included by dispersing methods known in the art such as by impregnating the oxygen storage component onto the palladium containing support in the form of an aqueous solution, drying and calcining the resulted mixture in air.

In the first or bottom layer, and in the top or second layer there is optionally a first bulk oxygen storage composition comprising an oxygen storage component which is preferably ceria, and/or praseodymia in bulk form as recited. By bulk form it is meant that a composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. No. 5,057,483 both hereby incorporated by reference.

In addition to the above listed components of the first layer composition and the second layer composition, it is optional that each layer contain a particular composite of zirconia and at least one rare earth oxide containing ceria. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

Both the first layer composition and second layer composition comprise a component which impart stabilization, preferably a first stabilizer in the first layer and second stabilizer in the second layer. The stabilizer is selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the first layer and second layer composition of the present invention use alkaline earth metal components. The alkaline earth metal components are preferably alkaline earth metal oxide. In a particularly preferred composition, it is desirable to use barium and strontium as the compound in the first and/or the second layer composition. The alkaline earth metal can be applied in a soluble form which upon calcining becomes the oxide. It is preferred that the soluble barium be provided as barium nitrate, barium acetate or barium hydroxide and the soluble strontium provided as strontium nitrate or strontium acetate, all of which upon calcining become the oxides.

In each of the first layer and second layer compositions, the amount of metal oxide thermal stabilizer combined with the alumina may be from about 0.05 to 30 weight percent, preferably from about 0.1 to 25 weight percent, based on the total weight of the combined alumina, stabilizer and catalytic metal component.

Additionally, both the first layer composition and the second layer composition contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

Both the first layer composition and the second layer composition contain at least one first promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia in the bottom layer, and neodymia or optionally lanthana in the top coat. While these compounds are known to act as stabilizers for the alumina support, their primary purpose in the composition of the present invention is to act as reaction promoters for the respective first and second layer compositions. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The first layer composition and/or the second layer composition of the present invention can contain other conventional additives such as sulfide suppressants, e.g., nickel or iron components. If nickel oxide is used, an amount from about 1 to 25% by weight of the first coat can be effective. As disclosed in U.S. Pat. No. 5,057,483 hereby incorporated by reference.

A particularly useful layered catalyst composite of the present invention comprises in the first layer from about 0.003 to 0.3 $g/in^3$ of the first palladium component; from about 0 to 0.065 $g/in^3$ of the first platinum group metal component other than palladium; from about 0.15 to about 2.0 $g./in^3$ of the first support, i.e., alumina; at least about 0.05 $g/in^3$ of the total first oxygen storage component in intimate contact with the palladium component; from about 0.025 to about 0.5 $g/in^3$ of at least one first alkaline earth metal components; from about 0.025 to about 0.5 $g/in^3$ of the first zirconium component; from about 0.025 to about 0.5 $g/in^3$ of at least one first rare earth metal component selected from the group consisting of lanthanum metal components and neodymium metal components; and comprises in the second layer from about 0.003 to 0.3 $g/in^3$ of the second palladium component and from about 0 to 0.065 $g/in^3$ of a second rhodium component or a second platinum component or mixture thereof, from about 0.15 $g/in^3$ to about 2.0 $g/in^3$ of the second support, i.e., alumina; and from about 0.025 to about 0.5 $g/in^3$ of the second zirconium component. This first and/or second layers can further comprise from about 0.025 $g/in^3$ to about 0.5 $g/in^3$ of a nickel component. The first and/or second layers further can include the particulate composite of zirconia and ceria in amounts from 0.0 to 2.0 $g/in^3$ comprising 60 to 90 wt. % zirconia, 10 to 30 wt. % ceria and from 0 to 10 wt % rare earth oxides comprising lanthana, neodymia and mixtures thereof. Weight of the palladium component and other platinum group metal components are based on the weight of the metal.

A useful and preferred first layer has:
from about 0.003 to about 0.6 $g/in^3$ of at least one palladium component;

from 0 to about 0.065 g/in$^3$ of at least one first platinum and/or first rhodium component;

from about 0.15 to about 2.0 g/in$^3$ of a first support;

from about 0.05 to about 2.0 g/in$^3$ of the total of the first oxygen storage components in the first layer;

from 0.0 and preferably about 0.025 to about 0.5 g/in$^3$ of at least one first alkaline earth metal component;

from 0.0 and preferably about 0.025 to about 0.5 g/in$^3$ of a first zirconium component; and from 0.0 and preferably about 0.025 to about 0.5 g/in$^3$ of at least one first rare earth metal component selected from the group consisting of ceria metal components, lanthanum metal components and neodymium metal component.

A useful and preferred second layer has:

from about 0.003 g/in$^3$ to about 0.6 g/in$^3$ of at least one second palladium component;

from 0.0 g/in$^3$ to about 0.065 g/in$^3$ of at least one first platinum and/or rhodium component;

from about 0.15 g/in$^3$ to about 2.0 g/in$^3$ of a second support;

from 0.0 and preferably about 0.025 g/in$^3$ to about 0.5 g/in$^3$ of at least one second rare earth metal component selected from the group consisting of lanthanum metal components and neodymium metal components;

from 0.0 and preferably about 0.25 g/in$^3$ to about 0.5 g/in$^3$ of at least one second alkaline earth metal component; and from 0.0 and preferably about 0.025 to about 0.5 g/in$^3$ of a second zirconium component. However, the first layer requires an alkaline earth metal component and/or a rare earth component, and the second layer requires an alkaline earth metal component and/or a rare earth metal component.

The first and/or second layer can have from 0.0 to about 2.0 g/in$^3$ of an oxygen storage composite comprising particulate form of cera-zirconia composite.

An alternative and useful catalyst composite disclosed in WO95/35152 comprises a first layer comprising at least one first palladium component. The first layer can optionally contain minor amounts of a platinum component based on the total platinum metal of the platinum components in the first and second layers. The second layer comprises at least two second platinum group metal components with one of the platinum group metal components preferably being a platinum component and the other preferably being a rhodium component.

Platinum group metal component support components in the first and second layers can be the same or different and are preferably compounds selected from the group consisting of silica, alumina and titania compounds. Preferred first and second supports can be activated compounds selected from the group consisting of alumina, silica, silica-alumina, alumino-silicates, alumina-zirconia, alumina-chromia, and alumina-ceria.

A specific and preferred embodiment of the present invention relates to a layered catalyst composite comprising a first inner layer which comprises a first support having at least one palladium component and from 0 to less than fifty weight percent based on platinum metal of at least one first layer platinum component based on the total amount of platinum metal in the first and second layers.

Preferably, the first layer comprises a first support, a first palladium component, at least one first stabilizer, and at least one first rare earth metal component selected from ceria, neodymia and lanthana. The first layer can also comprise a first oxygen storage composition which comprises a first oxygen storage component. The second layer preferably comprises a second support, at least one second platinum component, at least one rhodium component, and a second oxygen storage composition. There can be from fifty to one hundred weight percent based on platinum metal of the second layer platinum component based on the total amount of platinum metal in the first and second layers.

The second layer preferably comprises a "second" oxygen storage composition which comprises a diluted second oxygen storage component. The oxygen storage composition comprises a diluent in addition to the oxygen storage component. Useful and preferred diluents include refractory oxides. Diluent is used to mean that the second oxygen storage component is present in the oxygen storage composition in relatively minor amounts. The composition is a mixture which can be characterized as a composite which may or may not be a true solid solution. The second oxygen storage component is diluted to minimize interaction with the rhodium component. Such interaction may reduce long term catalytic activity. The second layer preferably comprises a second oxygen storage composition comprising a second oxygen storage component such as rare earth oxide, preferably ceria. The second oxygen storage component is diluted with a diluent such as a refractory metal oxide, preferably zirconia. A particularly preferred second oxygen storage composition is a co-precipitated ceria/zirconia composite. There is preferably up to 30 weight percent ceria and at least 70 weight percent zirconia. Preferably, the oxygen storage composition comprises ceria, and one or more of lanthana, neodymia, yttria or mixtures thereof in addition to ceria. A particularly preferred particulate composite comprises ceria, neodymia and zirconia. Preferably there is from 60 to 90 wt. % zirconia, 10–30% ceria and up to 10% neodymia. The ceria not only stabilizes the zirconia by preventing it from undergoing undesirable phase transformation, but also behaves as an oxygen storage component enhancing oxidation of carbon monoxide and the reduction of nitric oxides.

Preferably, the second oxygen storage composition is in bulk form. By bulk form it is meant that the composition is in a solid, preferably fine particulate form, more preferably having a particle size distribution such that at least about 95% by weight of the particles typically have a diameter of from 0.1 to 5.0, and preferably from 0.5 to 3 micrometers. Reference to the discussion of bulk particles is made to U.S. Pat. Nos. 4,714,694 and 5,057,483 both hereby incorporated by reference.

The second oxygen storage component and optional first oxygen storage component are preferably selected from the cerium group and preferably consist of cerium compounds, praseodymium, and/or neodymium compounds. When using cerium group compounds it has been found that if sulfur is present in the exhaust gas stream, objectionable hydrogen sulfide can form. When it is preferred to minimize hydrogen sulfide, it is preferred to additionally use Group IIA metal oxides, preferably strontium oxide and calcium oxide. Where it is desired to use cerium, praseodymium or neodymium compounds at least one of the first or second layers can further comprise a nickel or iron component to suppress hydrogen sulfide. Preferably, the first layer further comprises a nickel or iron component.

Stabilizers can be in either the first or second layers, and are preferably in the first layer. Stabilizers can be selected from at least one alkaline earth metal component derived from a metal selected from the group consisting of magnesium, barium, calcium and strontium, preferably strontium and barium. Zirconium components in the first and/or second layers is preferred and acts as both a stabilizer and a promoter. Rare earth oxides act to promote the catalytic activity of the first layer composition. Rare earth metal components are preferably selected from the group consisting of lanthanum metal components and neodymium metal components.

A useful and preferred first layer has:
from about 0.0175 to about 0.3 g/in$^3$ of palladium component;
from about 0 to about 0.065 g/in$^3$ of a first platinum component;
from about 0.15 to about 2.0 g/in$^3$ of a first support;
from about 0.025 to about 0.5 g/in$^3$ of at least one first alkaline earth metal component;
from about 0.025 to about 0.5 g/in$^3$ of a first zirconium component; and
from about 0.025 to about 0.5 g/in$^3$ of at least one first rare earth metal component selected from the group consisting of ceria metal components, lanthanum metal components and neodymium metal component.

A useful and preferred second layer has:
from about 0.001 g/in$^3$ to about 0.03 g/in$^3$ of a rhodium component;
from about 0.001 g/in$^3$ to about 0.15 g/in$^3$ of platinum;
from about 0.15 g/in$^3$ to about 1.5 g/in$^3$ of a second support;
from about 0.1 to 2.0 g/in$^3$ of a second oxygen storage composition;
from about 0.025 g/in$^3$ to about 0.5 g/in$^3$ of at least one second rare earth metal component selected from the group consisting of lanthanum metal components and neodymium metal components; and
from about 0.025 to about 0.5 g/in$^3$ of a second zirconium component.

The layered catalyst composites can be in the form of a self-supported article such as a pellet with the first layer on the inside and the second layer on the outside of the pellet. Alternatively, and more preferably, the first layer can be supported on a substrate, preferably a honeycomb carrier, and the second layer is supported on the first layer applied on the substrate.

When the compositions are applied as a thin coating to a monolithic carrier substrate, the proportions of ingredients are conventionally expressed as grams of material per cubic inch of catalyst as this measure accommodates different gas flow passage cell sizes in different monolithic carrier substrates. Platinum group metal components are based on the weight of the platinum group metal.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 700 or more flow channels ("cells") per square inch of cross section, although far fewer may be used. For example, the carrier may have from about 60 to 600, more usually from about 200 to 400, cells per square inch ("cpsi").

The discrete form and second coats of catalytic material, conventionally referred to as "washcoats", can be coated onto a suitable carrier with, preferably, the first coat adhered to the carrier and the second coat overlying and adhering to the first coat. With this arrangement, the gas being contacted with the catalyst, e.g., being flowed through the passageways of the catalytic material-coated carrier, will first contact the second or top coat and pass therethrough in order to contact the underlying bottom or first coat. However, in an alternative configuration, the second coat need not overlie the first coat but may be provided on an upstream (as sensed in the direction of gas flow through the catalyst composition) portion of the carrier, with the first coat provided on a downstream portion of the carrier. Thus, to apply the washcoat in this configuration, an upstream longitudinal segment only of the carrier would be dipped into a slurry of the second coat catalytic material, and dried, and the undipped downstream longitudinal segment of the carrier would then be dipped into a slurry of the first coat catalytic material and dried.

Alternatively, separate carriers may be used, one carrier on which the first coat is deposited and a second carrier on which the second coat is deposited, and then the two separate carriers may be positioned within a canister or other holding device and arranged so that the exhaust gas to be treated is flowed in series first through the catalyst containing the second coat and then through the catalyst containing the first coat thereon. However, as indicated above, it is preferred to utilize a catalyst composition in which the second coat overlies and adheres to the first coat because such configuration is believed both to simplify production of the catalyst composition and to enhance its efficacy.

C. Emission Control System

Figure 2:
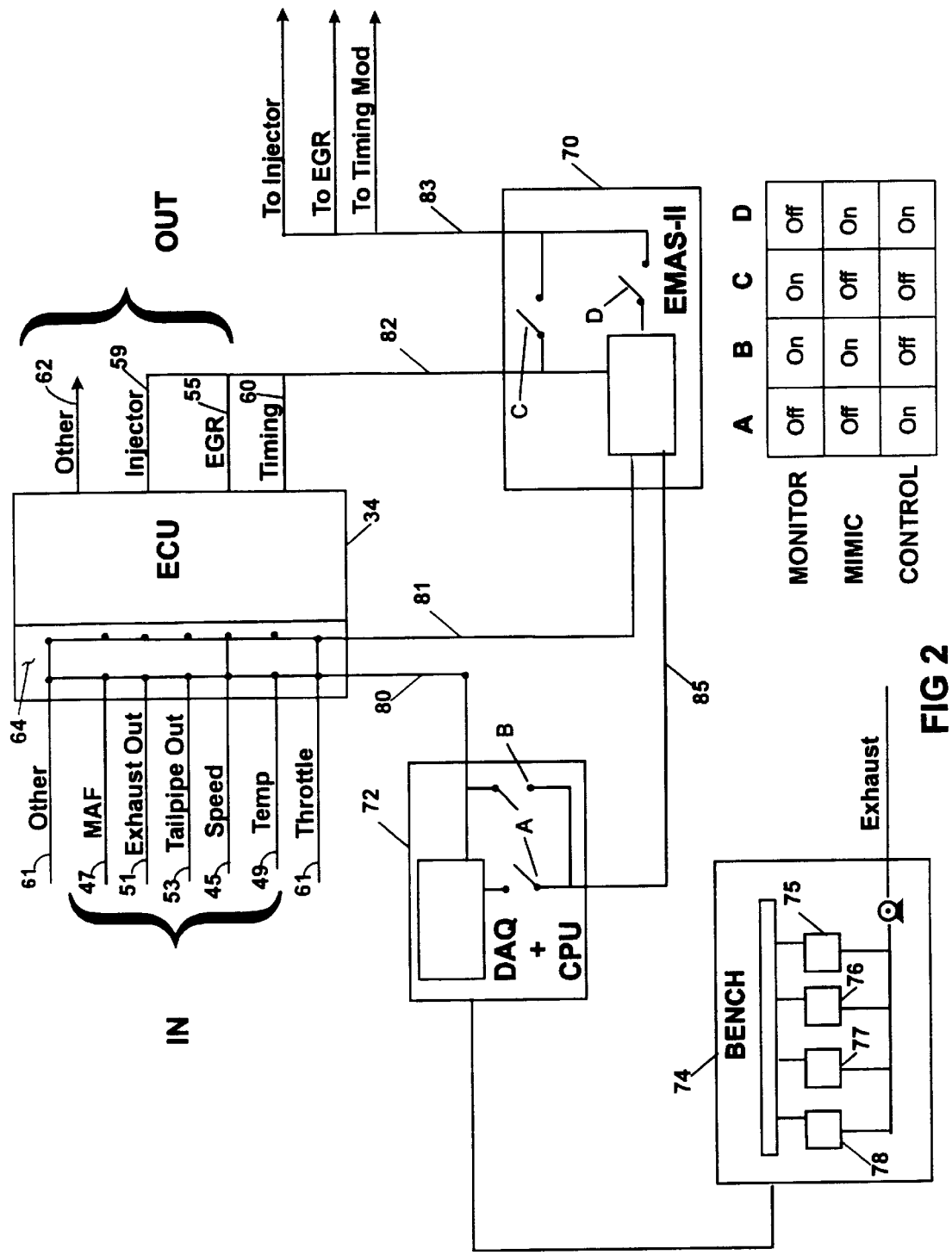
FIG. 2 is a diagrammatic view of the components used in the practice of the invention.

Referring now to FIG. 2, there is shown, in diagrammatic form, a system by which the method of the invention may be carried out. The system includes ECU 34 as described with reference to FIG. 1. As shown, sensor input signals to ECU 34 include manifold air flow, exhaust out, tailpipe out, speed, throttle position and temperature signals on input lines 47, 51, 53, 45, 61 and 49, respectively. It should be clear that other sensor signals other than those listed may be utilized in the system. The signals illustrated are basic input control signals and selected only for purposes of discussing the inventive concepts. Output actuator signals include injector, EGR and timing signals on output lines 59, 55 and 60, respectively. The invention is not limited to the output signals shown which are somewhat basic signals necessarily present in engine emission control. In addition, there is shown an other input signal line 61 and an other output actuator line 62 covering control of devices not directly related to the engine but nevertheless affecting engine operation such as the vehicle's climate control or air conditioning system.

Diagrammatically shown in FIG. 2 is a portion of a break-out box 64 of ECU 34 which is interposed at the peripheral connection with ECU 34 mentioned in FIG. 1 by which sensors and actuators connect with ECU 34. Breakout box 64 is defined in Nichols 5,396,794 and Gray 5,214,582 and reference should be had to those patents, incorporated herein by reference, for a detailed explanation of their function than explained herein. It should be noted that some of the sensor inputs are routed to other components in the system and then back to ECU 34 i.e., sensors 48, 50, 52, 49, while other sensor inputs are read by the other system components and also directly connected to ECU 34 such as speed sensor 45 and throttle position sensor 61. That is while speed sensor 45 can be systemically varied to obtain specific emission information, the invention is being described in the preferred embodiment relative to fixed drive cycles which impose specific torque/speed requirements on engine 10. In the sense that engine 10 is programmed to run a drive cycle, the speed sensor input will not be varied by the system of the invention and a direct connection is shown. However, the information in the speed sensor signal is needed by the system and is shown connected to the system. Similarly, the injector, EGR and timing signals 59, 55 and 60, respectively, are bypassed through one of the system components before being sent to their actuators.

In addition to ECU 34, the system includes a secondary controller 70 commercially marketed by Dynamic Control under the brand name EMAS-II. Secondary controller 70 is described in detail in Nichols U.S. Pat. Nos. 5,396,620 and 5,535,620 incorporated by reference herein and thus not shown or described in detail. (It must be noted that the inventive system is not, however, limited to an EMAS controller which is cited simply as a reference. Other controllers such as that shown in U.S. Pat. No. 5,214,582 to Gray can be used. Generally, any programmable controller capable of acquiring and storing sensor data in LUTs and programmable to access a stored control parameter correlated to sensed operating conditions which stored parameter is used to generate an analog actuator signal can be employed.) There are several modifications to an EMAS secondary controller 70 when compared to the system as described in the referenced patents. The modifications include expanding the capacity of secondary controller to account for the EGR function as well as the timing and injector controls. In addition, EMAS periodically returns the system to the control of ECU 34 as described in the referenced patents so that ECU 34 does not shut down engine 10 and generates a dummy sensor signal inputted to ECU 34 which tricks ECU into thinking engine 10 is at some assumed state. This feature is only optionally retained in the present invention and activated only should the system of the present invention choose engine operating conditions so severe as to cause engine shut down. The changes to the ECU signals effected by the invention are typically not so drastic as to cause sensor signal inputted to ECU 34 which would cause ECU 34 to shut down engine 10. Further and importantly, the emission sensor signal is used to control other emission functions such as EGR or fuel vapor canister discharge. The methodology of the invention is to sequentially optimize the tailpipe out emissions in the sense they are minimized or at target design catalyst converter design levels. Generating a fake emission signal, whether from UEGO or HEGO sensors, could, under certain operating conditions, adversely affect the operation of the other emission control systems.

Secondary controller's function is to i) monitor the performance of ECU 34 by acquiring input and output signal data from the sensors and actuators described; ii) mimic the performance of ECU 34 for the actuators whose functions are to be controlled by secondary controller 70 by assimilating the data acquired during the monitoring step thereby bypassing ECU 34 without using or relying on the code or proprietary details of ECU 34 and iii) control the actuators in accordance with instructions received from another source. Secondary controller 70 is essentially a stand alone controller with a set of boards designed for controlling the injector, a second set of boards designed for controlling spark timing and is modified in the inventive system of the present invention to provide an additional board(s) to control the EGR metering valve. At the same time secondary controller 70 does not interfere with the other control functions or operations performed by ECU 34. From a functional description, the injector boards have programmed therein the correlation between UEGO signal 51 and the A/F ratio sensed by UEGO 50 so that secondary controller 70 knows what the A/F ratio is at any time. During the monitoring stage, data from the other sensors as shown in FIG. 2 as well as the injector actuator signal is accumulated and stored in secondary controller's memory. During the training stage, the data is assimilated in look-up tables correlating UEGO signal 51 with other sensor signals and injector actuator signals so that secondary controller 70 can mimic or replicate the same injector signal as that produced by ECU 34 under the same driving conditions. The referenced patents then describe the circuits and relationship between the ECU and secondary controller by which the actuator signals are generated and by which control of the engine transfers from the ECU to secondary controller 70. Control switches from the ECU to secondary controller 70 when the user inputs an external signal to the secondary controller. In the invention, the external signal is the A/F ratio map and/or the EGR map and/or the spark timing map which is externally transmitted to secondary controller 70. Conceptually, the look-up tables or the map generated by secondary controller 70 during the monitoring and mimic phases of the procedure are replaced or modified by a map generated by an external source of the invention. In the referenced patents, an instruction was inputted, for example run the injector rich to prematurely age the catalytic converter. Secondary controller received this instruction and learning how to control the injector signal from the monitor and mimic phases, executed the instructed injector signal to give a rich mixture. This was an acceptable approach for steady state conditions allowing for generation of a transition phase and also generating fake emission signals or returning control to the ECU if the emission signals being generated were of a nature to cause shut-down. In the present invention the map generated by secondary controller 70 is replaced or portions thereof are replaced and secondary controller continues its mimic routine but with modified tables inputted from an external source. This allows for dynamic control of engine 10 in contrast to the prior system which was geared for steady state operation. It is well-known that emission concerns or emission breakthrough occur during transient and/or dynamic operating conditions of the vehicle such as during cold start, acceleration or deceleration. Accordingly, once control transitions from ECU 34 to secondary controller 70, the transferred control function is retained and under the complete control of secondary controller 70 to insure dynamic response.

The input instruction to secondary controller are generated from an emissions analyzer 72 which is a computer and data acquisition system receiving vehicular sensor input and additional sensor input information and containing sufficient programmed routines to generate the control instructions to secondary controller 70. Emissions analyzer 72 is a conventional computer having the same generic components as shown and described with reference to ECU 34. Its data acquisition system is equipped with an A/D converter and preferably a multiplexor enabling a serial scan of the input sensors shown in FIG. 2 with digitized sensor data stored in memory, preferably in look up tables. Emissions analyzer 72 also includes a D/A converter and an I/O module for connection to peripheral devices such as a CRT screen, a printer, a keyboard for user input etc. It should again be noted that emissions analyzer 72 is receiving all vehicular sensor input data affecting the operation of engine 10 which ECU 34 receives which bears on or affects, directly or indirectly, the catalytic converter system. This information, or at least most of the same vehicular information, is also being sensed by secondary controller 70 and to some extent both secondary controller 70 and emissions analyzer 72 may perform similar functions. For example, both units will generate an A/F ratio determination from the UEGO sensor signal. However, emissions analyzer 72 does not detect, monitor or directly control actuator output signals. Emissions analyzer 72 is programmed with a number of routines executed by its CPU which access data collected in look-up tables in its DAQ memory in response to user input instructions to generate a program routine which can be diagnosed, either by the user or through another programmed routine (such as one generated by trending the data, or establishing limits which the data can not exceed, etc) and modified, again either by the user or through additional programmed routine, and then sent to secondary controller 70 to use as input data for controlling actuators by routines programmed into secondary controller 70. For example and as will be explained in further detail below, a map of A/F ratios correlated to a number of vehicular sensor inputs is generated by both emission analyzer 72 and secondary controller 70. That is A/F ratios generated by ECU 43 is mapped as a function of engine speed, engine torque, emissions out, temperature, pressure etc. as determined by the engine sensors. That map is then modified by the user at emission analyzer 72 and the modified map sent to secondary controller 70 which generates injector actuator signals pursuant to the modified map. However, the A/F ratio map generated by emission analyzer 72 has additional operating parameters not sensed by the vehicle's input sensors which are also mapped as a function of the A/F ratio with the data stored from the vehicle's sensors. The additional operating parameters take the form of additional emission sensors contained in a bench gas analyzer 74. Bench gas analyzer 74 generates specific emission data not available from the vehicle's emission sensors. The bench sensor data is collected on a timed basis correlated to the vehicle's engine sensors, preferably on a multiplexed basis, and stored in appropriate look-up tables in the DAQ system of emission analyzer 72.

Reference can be had to U.S. Pat. No. 5,835,974 to Nagy (incorporated by reference herein) and to the Code of Federal Regulations, 40 CFR parts 86–99 for a detailed description of bench gas analyzer systems and the sensors approved for use in the bench gas analyzers. For example an exhaust gas analytical system for a diesel engine (and this invention applicable to diesel fueled engines) is set forth in Figure B90-7 at 40 CFR section 86.111–90. DOE approved gas sensors include a flame ionization detector (FID) 75 for the determination of hydrocarbons, a non-dispersive infrared analyzer (NDIR) 76 for the determination of carbon monoxide and carbon dioxide and a chemiluminescence analyzer (CL) 77 for the determination of oxides of nitrogen. The bench analyzer thus contains emission sensors which are more accurate than those typically used in the vehicle which can include besides the oxygen sensors discussed with reference to FIG. 1, hydrocarbon sensors, calorimetric sensors and oxides of Nitrogen sensors. In accordance with a broad scope of the invention, bench gas analyzer 74 comprises a gas analytic system sufficient only to meet emission regulation testing as specified in the CFR. and containing only the approved and/or specified gas sensors. In such instance, the invention bears a resemblance to the methodology employed by the auto manufacturers in the calibration of ECU 34 but lacking secondary controller 72. However, in accordance with a different scope of the invention, additional gas sensors generically designated by block 78 in FIG. 2 are included in gas bench analyzer 74 which measure either additional emission components not measured in a CFR bench test or an enhanced measurement of the components sensed in a CFR bench test in the sense that a more accurate or more detailed measurement is obtained. For example a Fourier transform infrared detector (FTIR) can be employed to measure hydrocarbon species such as propane, butane, hexane but also with respect to diesel fuels or alternative fuels measure aliphatic, aromatic, ketone and aldehyde content and is an example of a more accurate or detailed measurement of HC than that available in a CFR bench test. Examples of sensors which measure additional emission components not currently sensed include a mass spectrometer which can measure $H_2S$, hydrogen sulfide emissions, or $SO_2$, sulfur dioxide emissions, or an electron capture detector which can measure $N_2O$, nitrous oxides, which is not currently regulated but is believed to contribute to the greenhouse effect. Additional sensors 78 are all conventionally known and commercially available. For example, an FTIR suitable for use in the invention is commercially available from Nicolet and a satisfactory electron capture detector is commercially available from Schimadzu in their gas chromatograph. Additionally, it is also to be noted that for diagrammatic purposes bench gas analyzer is shown in FIG. 2 as receiving exhaust emissions and it is to be understood that exhaust emissions include, for the typical application illustrated, engine out as well as tailpipe emissions. Further, in accordance with a broader scope of the invention, bench gas analyzer may be connected to and record and transmit data relating to specific gases used in the catalytic converter system.

Referring still to FIG. 2, there is shown only for purposes of conceptual explanation, an arrangement which illustrates how ECU 34, secondary controller 70 and emission analyzer (including bench gas analyzer 74) function with respect to one another to allow the monitor, mimic and control steps of the invention to be performed. As shown there is a sensor input line 80 which connects emission analyzer 72 to ECU 34. There is a sensor output line 81 which connects from secondary controller to ECU 34. There is also an actuator input line 82 which connects to secondary controller 72 and an actuator output line 83 which connects to the actuator controlled by the signal on actuator output line 83. In all instances i) vehicle sensor signals are received by emission analyzer 72 (as well as input from bench gas analyzer 74) from sensor input line 80, ii) vehicle sensor signals are transmitted to ECU 34 by secondary controller 70 from sensor output line 81, iii) ECU 34 generated actuator output signals are transmitted to secondary controller 70 from actuator input line 82 and iv) actuator output signals (whether generated by ECU 34 or secondary controller 70) are transmitted from secondary controller 70 through actuator output line 83. Switches "A" and "B", associated with emissions analyzer 72 and switches "C" and "D" associated with secondary controller 70 control the monitor, mimic and control functions of the invention as shown in the table set forth below.

| FUNCTION | SWITCH | | | |
| --- | --- | --- | --- | --- |
|  | A | B | C | D |
| MONITOR | OFF | ON | ON | OFF |
| MIMIC | OFF | ON | OFF | ON |
| CONTROL | ON | OFF | OFF | ON |

When the system is in its initial monitoring mode, sensor information is stored in memory in emission analyzer 72 and because switch "B" is on, the same information is stored in memory in secondary controller 70 and sent back unchanged to ECU 34. ECU 34 generates actuator output signals which are stored in memory in secondary controller 70 and because of switch "C" and "D" positions, the ECU output signals are transmitted as actuator signals to the actuators. In the mimic position, sensor information is stored in memory in emission analyzer 72 and because switch "B" is on, the same information is stored in memory in secondary controller 70 and sent back unchanged to ECU 34. ECU 34 generates actuator output signals which are stored in memory in secondary controller 70. However, because of the position of switches "C" and "D", the actuator output signals are generated by secondary controller 70. In the control step, sensor information is stored in memory in emission analyzer 72 and because of the position of switches "A" and "B" is not sent to secondary controller 70 directly. The sensor signal information and the protocol, i.e., the modified look-up tables or map or modified portions thereof produced by emission analyzer 72, are sent from emission analyzer 72 to secondary controller 70 along preferably, a bi-directional link 85. The sensor signal information is routed back to ECU 34 from secondary controller 70 and the actuator output signals from ECU 34 are directed to secondary controller 70 and optionally, and somewhat preferably, to emission analyzer 72. Because of the position of switches "C" and "D", the actuator signals outputted to the actuators are generated by secondary controller 70.

It is understood, of course, that the generation of the control maps, the emission maps, the modification of the maps, the switching function etc. are all performed under routines programmed into emission analyzer 72 and secondary controller 70 and implemented by their CPU's in a manner similar to that described for ECU 34. The routines are readily generated by one skilled in the programming art once the objective or functions of those routines, as set forth herein, are explained. Thus the routines are not shown or described in detail herein. Also not shown in the drawings is a controller for performing the drive cycles referred to herein nor the routine by which the drive cycle is effected.

D. An A/F Ratio Example

The following graphs provide an illustration of how the A/F ratio is changed by the inventive system to reduce emissions or reach target engineering catalyst design parameters. The graphs are constructed for only a portion of an FTP drive cycle. Actual test data was used from two runs to construct the graphs and because the differences between the two runs was significant, the graphs were constructed to show how the system could change the emissions by varying the A/F ratio. The graphs do not result from actual tests of the inventive system. They are shown for illustration purposes only.

In accordance with the inventive system the initial step is to record data with the vehicle under control of ECU 34 and obtain data on the control parameter, which in the graphs illustrative of the preferred embodiment is the A/F ratio, correlated to at least one operating condition of the vehicle. There are a number of vehicle operating conditions which affect the control parameter, i.e., the A/F ratio, such as the emissions generated, the temperature, vehicle speed, vehicle load or torques (accelerating, coasting, idling or decelerating), gas flow etc.

Figure 3:
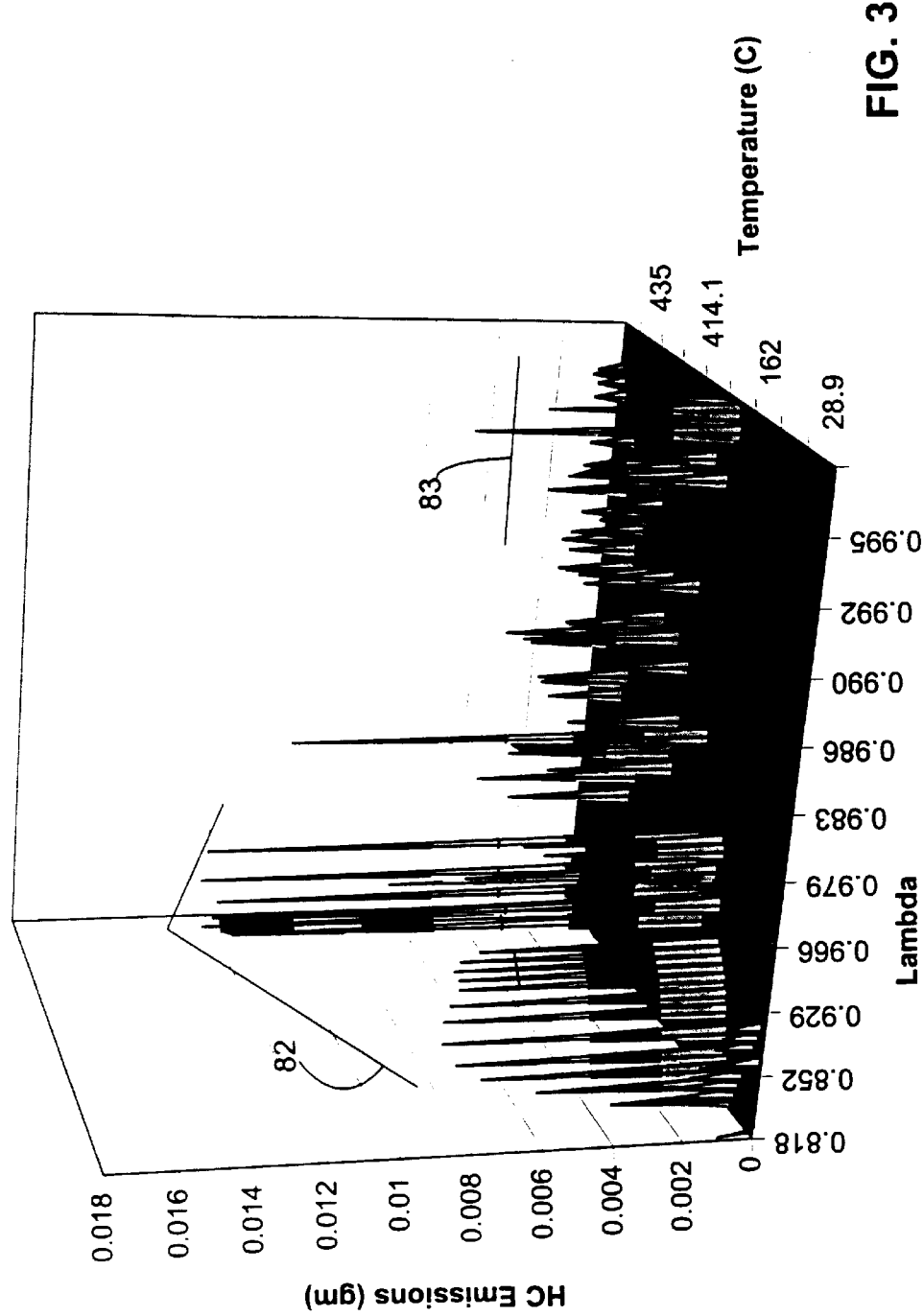
FIG. 3 is a constructed map of original tailpipe HC emissions plotted as a function of the vehicle's exhaust gas temperature and lambda (A/F ratio) taken over a portion of a regulated drive cycle.

Referring now to FIG. 3, one such map or look-up table has been generated for the beginning portion of an FTP drive cycle which includes a cold start segment. In the map of FIG. 3, the total hydrocarbon emissions, HC, accumulated during the drive cycle is plotted on the vertical or y-axis. The A/F ratio shown as lambda is plotted on the horizontal or x-axis and the temperature of the exhaust gas is plotted on the depth or z-axis. The exhaust gas temperature can be determined from a direct measurement or may be determined from calculations based on direct measurements of ambient and engine temperature. If calculated, the routine for calculating the exhaust temperature (several of which are known in the art) is programmed into emission analyzer 72. The HC emission data was obtained from bench gas analyzer 74. Emission analyzer 72 contains the look-up tables and the programmed routine to generate FIG. 3. Similar maps for other operating parameters for the z-axis may be or are generated, for example vehicle speed or exhaust gas flow. In fact A/F ratio maps correlated to engine speed, engine torque, tailpipe HEGO sensor readings etc., must be generated for both emission analyzer 72 and secondary controller 70. Secondary controller 70 uses such maps to control injector 25 while emission analyzer modifies such maps to optimize the emissions resulting from varying the emission/AF/ratio maps generated such as shown in FIG. 3. FIG. 3 is chosen because it is known that HC emissions of the vehicle are significant until the engine reaches operating temperature whereat they are significantly reduced if the catalytic converter is catalytically active. This fact is somewhat dramatically illustrated in FIG. 3. Note that the HC emissions generated when the engine is cold such as those emissions falling under the line designated by reference numeral 82 are significantly greater than the HC emissions exhausted to atmosphere when the engine is warmed such as those shown falling under the line designated by reference numeral 83.

Figure 4:
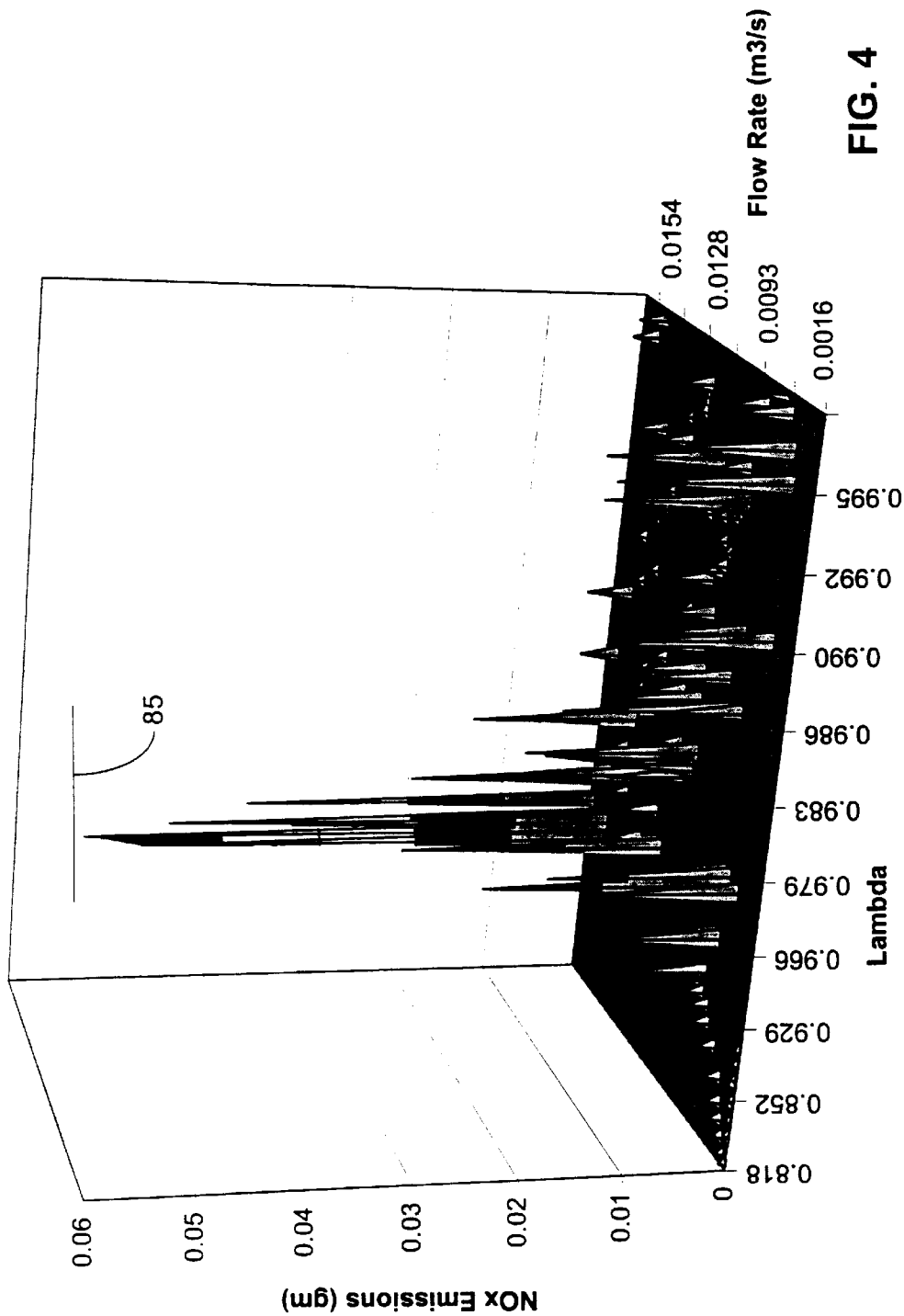
FIG. 4 is a constructed map of original tailpipe NOx emissions plotted as a function of the vehicle's exhaust gas flow rate and lambda (A/F ratio) taken over a portion of a regulated drive cycle.

Referring now to FIG. 4, there is shown a map, similar to FIG. 3, but generated for the NOx emissions produced by the vehicle under control of ECU 34. NOx emissions, as determined from bench gas analyzer 74, is plotted on the vertical or y-axis. The A/F ratio, expressed as lambda, is plotted on the horizontal or x-axis and plotted on the depth or z-axis is the speed or flow rate of the exhaust gas. While other engine operating parameters can and are chosen for the z-axis, the flow rate is chosen for illustration because it is known that the NOx conversion is a function of the A/F ratio perturbation and the space velocity of gas flow through the catalytic converter. This is somewhat dramatically illustrated by the high NOx emissions produced at higher flow rates such as those shown falling under the line drawn on FIG. 4 indicated by reference numeral 85.

Figure 5:
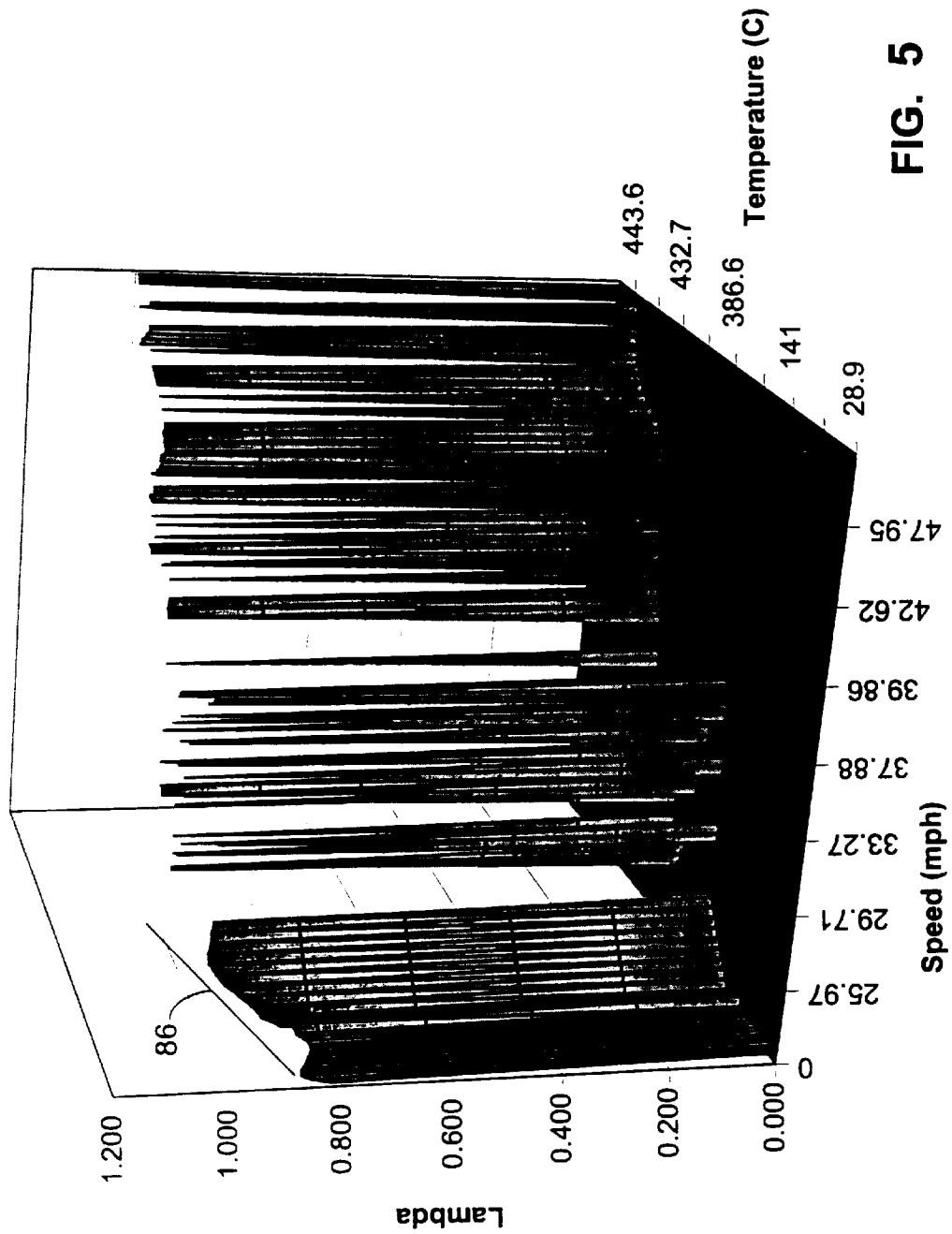
FIG. 5 is a constructed map of original lambda plotted as a function of vehicle speed and exhaust gas temperature taken over a portion of a regulated drive cycle.

Referring now to FIG. 5, there is shown one of the A/F ratio maps (the principal one) generated to produce actuator signals controlling the operation of injector 25 and discussed briefly in connection with FIG. 3. In FIG. 5, the A/F ratio, expressed as lambda (a number expressed as a fraction in which the numerator is the A/F ratio currently used by the engine and the denominator is the A/F ratio necessary to produce stoichiometric combustion), is plotted on the vertical or y-axis. The vehicular speed as measured during the drive cycle is expressed in mph on the horizontal or x-axis and the temperature of the exhaust gas is plotted on the depth or z-axis. Note that the lambda values selected by ECU 34 during the cold start segment of the drive cycle have a particular shape. The cold start lambda values are generally shown by the plotted portions of the map falling beneath the line designated by reference number 86 in FIG. 5. It should be recalled that the cold start portion of the drive cycle is controlled open loop by ECU 34 since the EGO signals have not warmed sufficiently to give accurate readings. Simply as a matter of definition, "cold start" conventionally means when the engine and converter are at temperatures not greater than about 50 degree C when the engine is started. "Light-off" generally refers to a condition of the catalytic converter where 50% of the combustible emissions are converted by the catalytic converter. Typically, the temperature of the catalytic converter significantly increases after the light-off temperature is reached. The cold start segment of a drive cycle starts at cold start and continues to at least light-off.

The general methodology in optimizing the emissions generated by engine 10 in accordance with the example illustrated herein is simple and straightforward. The emission based maps which are the maps shown in FIGS. 3 and 4 are studied to determine only those portions of the maps where emissions are produced in the greatest quantity. The control parameter, the A/F ratio in the preferred embodiment, is then modified for only those portions of the emission maps where significant quantities of emissions are produced as determined from the emission maps of FIGS. 3 and 4. The modification of the A/F ratio is made to the A/F ratio map which ECU 34 uses to control injector 25 which in the illustrated example is FIG. 5. Note that the z-axis of FIG. 3 corresponds to the z-axis of FIG. 5. Note also that vehicle speed correlates, at least at steady state condition, to exhaust flow rate so that the z-axis of FIG. 4 corresponds to the x-axis of FIG. 5. Alternatively a second ECU map plotting exhaust flow on the z-axis can be constructed. The modified FIG. 5 is then inputted from engine analyzer 72 to secondary controller 70 which uses the modified FIG. 5 to generate actuator signals for injector 25 from the vehicle sensor input data. During the monitoring state, secondary controller 70 built a look-up table which correlates what the actuator output signal for injector is for any A/F ratio. Thus insofar as the operation of secondary controller 70 is concerned and considering only the A/F ratio map of FIG. 5, the vehicle's speed sensor and exhaust gas temperatures will be read into the A/F ratio map which will set a specific A/F ratio the engine is to have at that instant. Secondary controller 70 will take that A/F ratio to its look-up table and generate the appropriate analog signal for injector 25. The FTP drive cycle is repeated and new FIGS. 3 and 4 generated. The newly generated emission maps are also analyzed for portions of significant emissions and the A/F ratio of modified FIG. 5 changed again. The method continues for any number of iterations until an optimum emission level is reached. The process readily lends itself to relatively simple programmable routines which can be automatically performed by emission analyzer 72. Pertinent emission map areas which are to be changed can be readily identified by establishing a maximum quantity/count limit and a stepped change, rich or lean, can be automatically instituted for the map portions identified. A trend program then determines when an optimum is reached.

Figure 5A:
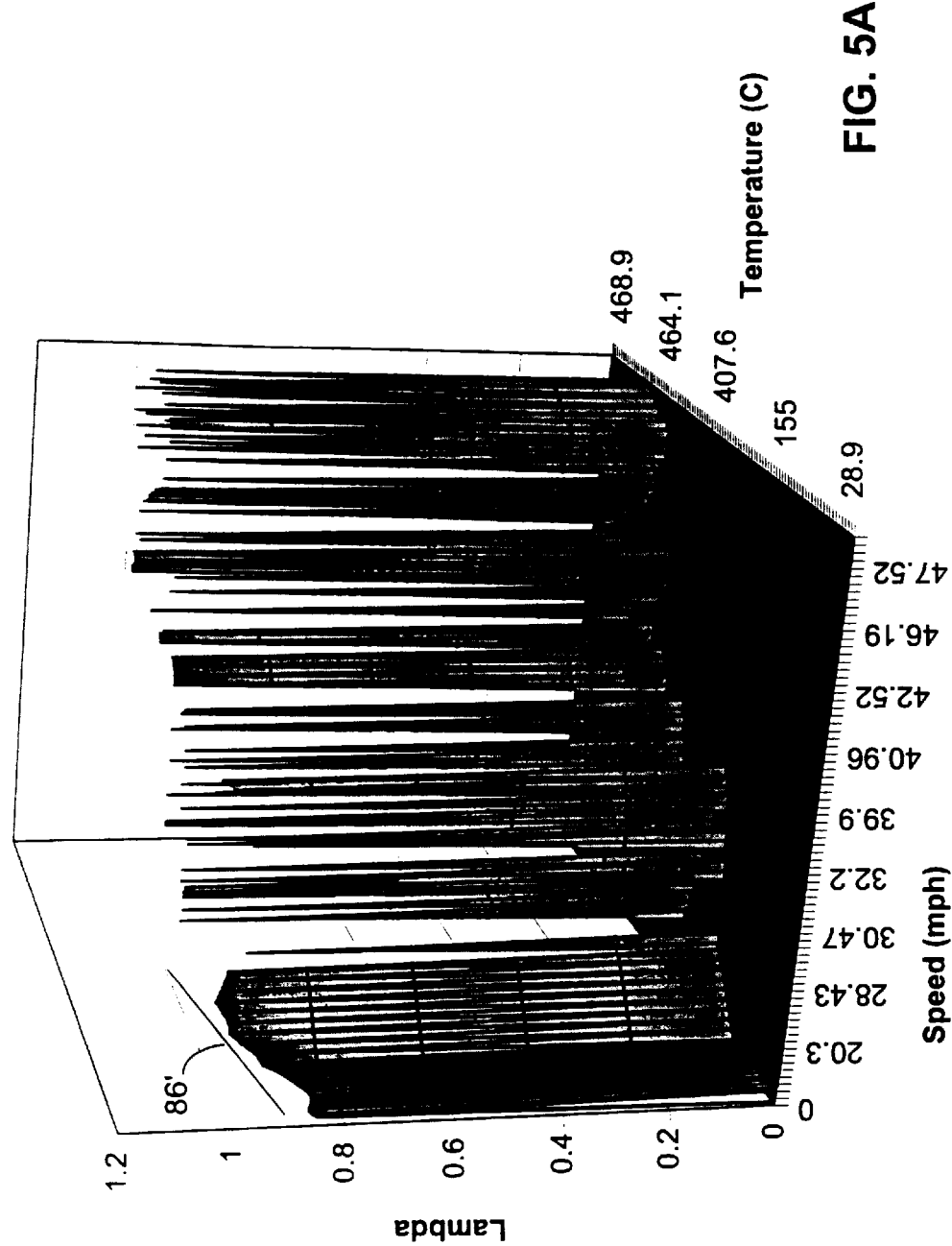
FIG. 5A is a constructed map of optimized lambda plotted as function of vehicle speed and exhaust gas temperature taken over a portion of a regulated drive cycle.

Reference can now be had to FIGS. 3A, 4A and 5A which show the results of modifications discussed above with respect to FIGS. 3, 4 and 5, respectively. For illustrative purposes only, the A/F ratio was changed to a more lean mixture in that lambda was increased by about 0.01 for those portions of the FIG. 3 and 4 maps which produced the greatest amount of sensed emissions. This change resulted in FIG. 5A which is the modified A/F ratio map used by secondary controller 70 to control injector 25. Note the change in the closed start segment of lambda as shown by the map portion falling under line designated by reference numeral 86' in FIG. 5A as compared to the map under line 86 shown in FIG. 5. The change in emissions falling under lines designated by reference numerals 82' and 83' in FIG. 3A should be compared to the original emissions generated under lines 82 and 83 in FIG. 3. A similar dramatic improvement is shown in the emissions falling under the line designated by reference numeral 85' in FIG. 4A when compared to the emissions falling under line 85 in FIG. 4.

Figure 6:
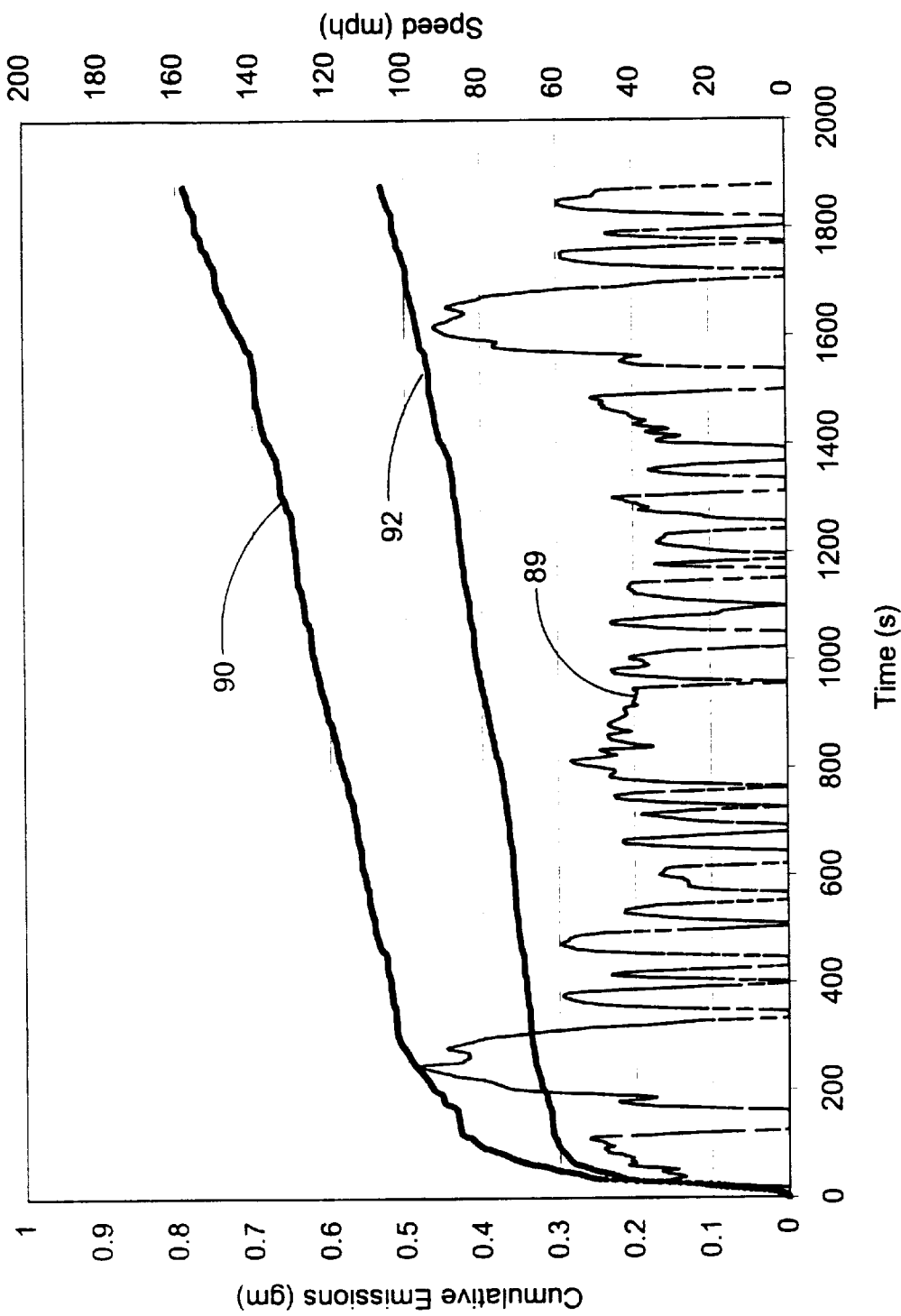
FIG. 6 is a constructed plot showing a comparison of cumulative HC emissions emitted during a portion of an FTP test before and after A/F ratio optimization effected in accordance with the invention.
Figure 7:
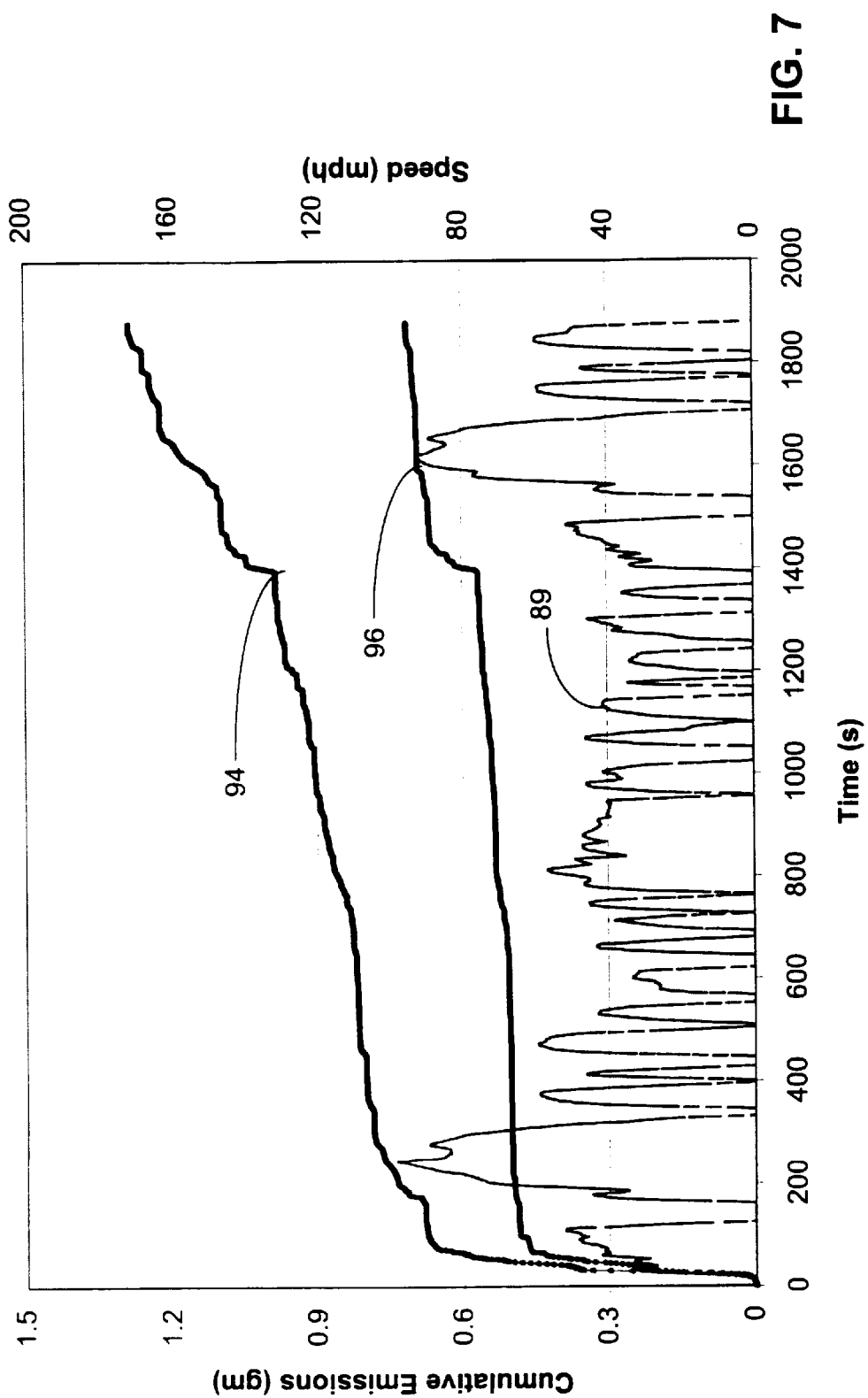
FIG. 7 is a constructed plot showing a comparison of cumulative NOx emissions emitted during a portion of an FTP test before and after A/F ratio optimization effected in accordance with the invention.

The data shown in the maps of FIGS. 3, 3A, 4, 4A and 5,5A is more clearly demonstrated by reference to FIGS. 6 and 7. FIG. 6 is a plot of cumulative HC emissions for a portion of the FTP drive cycle. The portion of the drive cycle plotted is shown as time as seconds on the horizontal x-axis and the speed of the vehicle over that time is plotted on the y-axis and shown as mph at the far right hand y-axis legend. The dashed curve at the bottom of the graph and designated by reference numeral 89 is a plot of the vehicle's speed during the graphed portion of the FTP drive cycle. Also plotted on the y-axis and indicated by left-hand axis legend is the HC emissions recorded at the time and speeds of the vehicles indicated. The top most solid line designated by reference numeral 90 is the emissions recorded for the FTP drive cycle graph portion plotted when the vehicle was under the control of ECU 34 as calibrated by the automobile manufacturer. The lower solid line designated by reference numeral 92 is the emissions recorded for the FTP drive cycle graph portion plotted with the vehicle under the control of the modified A/F ratio map as implemented by secondary controller 70. A significant reduction in HC emissions is shown by the change in the A/F ratio. Similarly, FIG. 7 shows the NOx emissions generated by the vehicle during the same drive cycle portion of the graph shown by the dashed line marked with reference numeral 89. The original NOx emissions are shown by the top plot indicated by reference numeral 94 and the improved NOx emissions are shown by the lower plot indicated by the reference numeral 96.

E. Other Examples

The methodology employed for improving the EGR control and the spark advance control is similar to that described for the A/F ratio. For example, an EGR control map is generated similar to that described for FIG. 5 for the A/F ratio control map. This is the map which secondary controller 70 accesses to produce actuator signals driving EGR solenoid valve 56 to variably control the EGR emissions mixed with the combustible air/fuel mixture injected to cylinder 13. Emission analyzer 72 will then generate HC and NOx emission maps similar to that shown for FIGS. 3 and 4 with the EGR settings plotted against emissions recorded from bench gas analyzer 74 and at least one engine operating parameter as determined by emission analyzer 72. Again the emission maps will correlate to an engine operating parameter which in turn will be correlated to an operating parameter plotted on the control map. The emission maps will be analyzed to determine those portions whereat excessive emissions are produced and the EGR settings for the excessive emission map portions will be changed and inputted to the EGR control map. The FTP drive cycle is repeated with the modified control map and emission data obtained and analyzed and the process repeated until the emissions attributed to the function of the EGR are optimized. A similar process is affected for spark advance.

Figure 8:
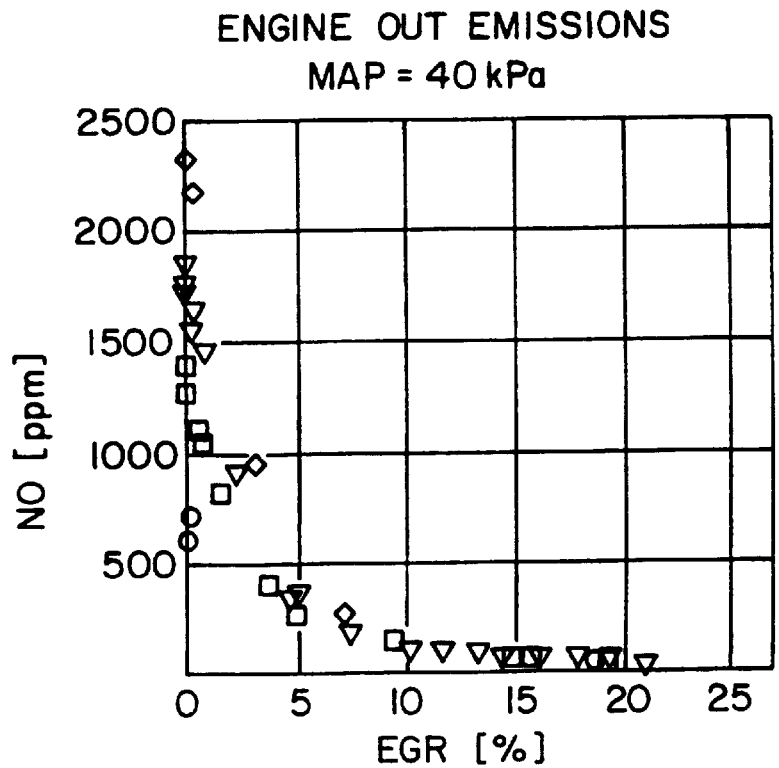
FIG. 8 is a graph of NOx emissions plotted as a function of EGR (exhaust gas recirculation) percentage of the air and fuel admitted to the engine.
Figure 9:
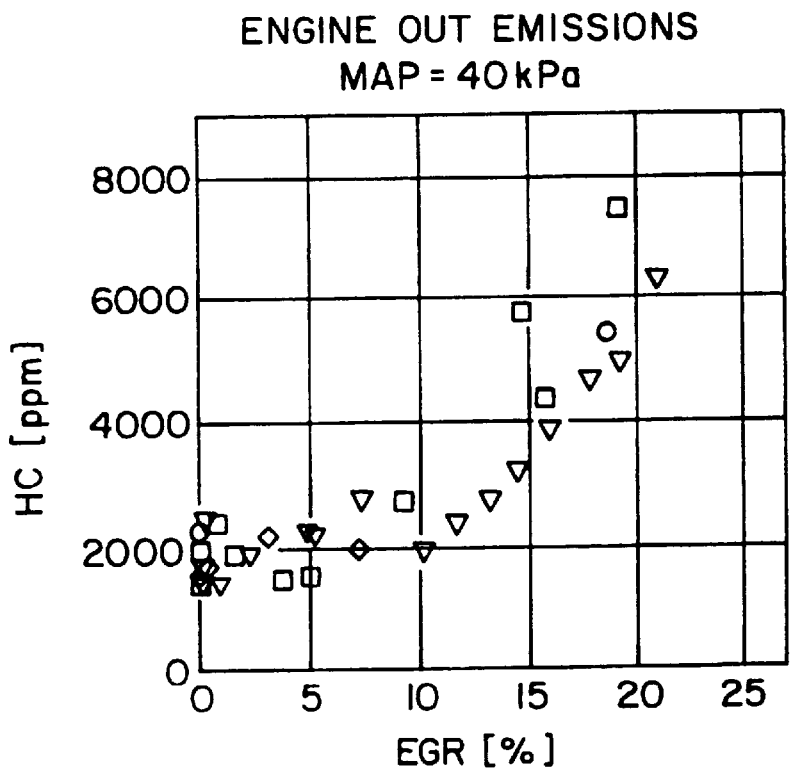
FIG. 9 is a graph of HC emissions plotted as a function of EGR percentage of air and fuel admitted to the engine.

The inventive system optimizes the emissions by normally proceeding through a sequential optimization of each engine function which affects the catalytic converter system. Normally the A/F ratio is optimized followed by optimization of the EGR function followed, in turn, by the spark advance although the optimization order is not especially significant. Depending upon the base line emission and the particular emission component treatment to be optimized, the sequence might be modified. Generally, the optimization of one control function will not necessarily impact the optimization of another control function. However, there are limits as to the variation of any control function which are programmed in the routines which analyze the emission maps. This can be illustrated by reference to FIGS. 8 and 9. FIG. 8 is a plot of several tests in which the NOx emissions from the engine (not from the catalytic converter) were plotted as a result of the concentration of EGR metered to the combustible air/fuel mixture injected into the cylinder. FIG. 8 clearly shows that as the EGR settings are increased, the NOx produced by the engine is reduced. This is conventionally well known. FIG. 9 is a plot of several tests in which the HC emissions from the engine (not from the catalytic converter) are plotted as a function of the EGR setting and shows a definite trend increasing the HC emission concentration produced by the engine at higher EGR settings. FIG. 9 is generally not known in the art and is reproduced from U.S. patent application Ser. No. 09/019, 085 filed Feb. 6, 1998 and owned by the assignee of this invention. FIG. 9 does not, per se, form part of this invention and is cited to show that in optimizing the EGR emission curve, the EGR settings will fall within a band whereat NOx engine out emissions will be reduced without increasing HC engine out emissions. Limitations in the range of adjusting control parameters to optimize emissions, such as a setting range for the EGR valve, are easily implemented in programmable routines performed by emission analyzer 72.

The invention has been described thus far in the general sense of meeting emission regulations for existing catalytic converter systems. An important feature of the inventive system is its implementation in the design of or in the analysis of a design for a catalyst or a catalytic converter system which has generally been referred to above as the ability of the system to meet engineering targets. The engineering targets can, of course, be met by following the examples set forth above to evaluate various catalytic converter systems. However, the inventive system may be modified to include at least two different processes or steps to meet the engineering target.

The first modification, which has been mentioned above with respect to bench, gas analyzer 74 is to equip the analyzer with additional gas sensors measuring emission components which are not currently measured today for emission compliance. The inventive system will generate emission maps for those emission components which are then manipulated in the manner described to evaluate the design of the catalytic converter system or change the design of the catalytic converter system to achieve engineering targets. An example of such a modification is the use of an FTIR or, conceptually a mass spectrometer or other known gas analyzing instrument to determine speciation of the non-methane hydrocarbon emissions. Ozone (created at ground levels by the photo chemical reaction of reactive organic gases such as non-methane hydrocarbons and the oxides of nitrogen) leads to harmful respiratory effects and other environmental effects. By acquiring specific non-methane hydrocarbon species information, the engine controls can be optimized to minimize certain hydrocarbons such as aldehydes or ketones and the catalyst formulation fine-tuned to convert such organic gases. Another specific example is the use of a mass spectrometer in the bench gas analyzer 72 to measure sulfur ($H_2S$ and $SO_2$) and manipulate the A/F ratio in the manner described to minimize the effect of sulphur on the catalytic converter. Sulfur is not a regulated exhaust gas emission. However, it is well known that sulfur can degrade or poison the catalyst in the catalytic converter causing premature failure of the catalytic converter system and as a result, fuel regulations such as promulgated in California and which are nationally under consideration limit the amount of sulfur. For example, if the A/F ratio is always lean, sulfur can be stored in the catalyst as $SO_2$ or as a sulfate and reduce the effectiveness of the catalyst in controlling the emission. Again the inventive system is suited to such an analysis by setting limits at which the A/F ratio can be sequentially adjusted, even for fuel with minimal sulfur content, in the sulfur emission maps generated by the inventive system. It should be noted that the inventive system considers the perturbation frequency at which the A/F ratio cycles about stoichiometric (for those systems which cycle the A/F ratio) to be a control variable optimized by the present invention. For example, to minimize the chances of premature catalyst failure attributed to sulfur poisoning, the A/F ratio control map may also include a map variably controlling the cycling frequency of the A/F ratio about stoichiometric. As with the other examples, the system would impose a limitation on how far the perturbations can be adjusted. In this instance the limitation would be a limit on the length of the cycle since it is known that long cycle times can adversely affect driveability.

The second modification and one of the underpinnings of the invention is the changing of the catalytic converter design and evaluation thereof made possible by the inventive system. Generally, the second modification is to add to the inventive system the additional step or process of changing a design parameter of the catalytic converter system which is subsequently evaluated by the inventive system so that either a more economical catalytic converter system is produced and/or, the catalytic converter efficiency at converting the emissions is improved. For example, the efficiency of a given catalytic converter system is optimized by the inventive system generating the modified control maps as discussed used by ECU 34 to control the A/F ratio of engine 10 (and/or the EGR concentration, the spark timing of A/F ratio perturbation frequency). As optimized, it is now apparent from the HC emission maps that HC emissions generated by the optimized control are well below emission regulations. The inventive system now performs the additional step of sequentially reducing the precious metal loading of the catalyst and/or reducing the catalyst volume which are subsequently evaluated by the inventive system generating emission maps. Additionally, the optimized control map previously generated may have to further modified due to changes in the catalytic converter design.

Generally speaking the design parameters of the catalytic converter which are modified are either chemical formulations or physical parameters. The chemical formulations of the catalytic converter which are varied include the precious metals in the washcoat of the catalytic converter or the oxygen storage material or the promoters and/or the stabilizers in the washcoat. The physical design parameters which are varied include the volume of the catalytic converter and/or the geometric configuration of the gas passages through the catalytic converter and/or the wall thickness of the substrate and/or the cell density of the gas passages. As in the optimization of the engine control parameters, the design parameters are varied within limits. The limits for the chemical formulations of TWC 33 and close-coupled catalyst 32, as they are specified herein, are the ranges of the formulations previously specified in this Detailed Description. That is the inventive system provides a methodology for optimizing catalytic converter performance within the ranges at which the catalytic converter will convert emissions. However, in the design of future systems limits beyond the ranges may be used in systems with or without non-conventional catalytic converter adsorbers and reactors.

The invention has been described with reference to a preferred embodiment and to alternative embodiments. Obviously, modifications and alterations will become apparent to those skilled in the art upon reading and understanding the Detailed Description of the invention. For example those skilled in the art should readily understand how the inventive system can function for analyzing catalytic converter system for diesel fueled vehicles or for vehicles equipped with vaporized fuel injectors or for vehicles powered by blended fuels such as alcohol based fuels. Still further, small engine vehicular applications and the like may not be equipped with vehicle sensors such as those illustrated with engine operation principally being open loop. Those skilled in the art will recognize that the inventive system is nevertheless applicable to such applications from the discussion above relating to the cold start segment of the drive cycle. That is the inventive system will apply sensors to obtain the desired parameters to make the open loop control adjustments required for such vehicle applications. It is intended to cover all such modifications and alterations insofar as they come within the scope of the present invention.

Having thus defined the invention, it is claimed:

1. A method for optimizing the code of a vehicular ECU controlling an internal combustion engine in a vehicle equipped with a catalytic converter system having at least one catalytic converter, to meet vehicular emission objectives, comprising the steps of:
   a) operating the vehicle to replicate a regulation mandated drive cycle and in the process thereof causing said ECU to output ECU actuator signals;
   b) generating an A/F ratio map correlated to at least one operating parameter signal inputted to said ECU when and as said vehicle replicates said regulation mandated drive cycle;
   c) training a second controller to selectively generate said ECU actuator signals by initially monitoring and then mimicking the ECU's generation of said ECU actuator signals;
   d) during said regulation mandated drive cycle, measuring emissions in the vehicle's exhaust gases before and after the catalytic converter by vehicle sensors and exhaust gas sensors to determine in a bench analyzer specific emissions and total emissions generated at specific intervals in the drive cycle;
   e) modifying the A/F ratio map to reduce the emissions detected in step d and produce a modified A/F ratio map;
   f) repeating the drive cycle with modified ECU actuator signals generated by the modified A/F ratio map inputted to the engine by the second controller with the ECU actuator signals bypassed; and,
   g) sequentially repeating steps d, e and f until the vehicle meets desired emission objectives.

2. The method of claim 1 wherein said actuator signal is at least one signal selected from the group consisting of
   i) a fuel injector,
   ii) engine spark timing, and
   iii) engine intake valve and exhaust valve timing.

3. The method of claim 1 further including the steps of generating an EGR ratio map of ECU EGR actuator signals outputted by the ECU correlated to at least one engine operating parameter inputted to the ECU during the regulation man-dated drive cycle; training the second controller to mimic the ECU EGR actuator signals; changing the EGR ratio map to reduce the emissions detected in step and produce a modified EGR map; repeating said regulation mandated drive cycle with EGR actuator signals generated by the modified EGR map bypassing the ECU EGR signals and iteratively repeating the steps of changing the modified EGR map followed by conducting said regulation mandated drive cycle until the changes result in compliance with emission objectives.

4. The method of claim 1 wherein said regulation mandated drive cycle includes a cold start test commencing with a cold start of the vehicle and continuing until the time the vehicle's emission sensors are able to respond to the extent that closed loop control of said ECU by the vehicle's emission sensors are possible; and said modification of said A/F ratio map being an open loop modification relative to the vehicle's emission sensors.

5. The method of claim 1 wherein said actuator signal is a signal controlling a fuel injector of said vehicle.

6. The method of claim 5 wherein said operating parameter includes at least one parameter selected from the group consisting of
   i) engine speed;
   ii) engine load;
   iii) mass air flow;
   iv) manifold absolute pressure
   v) engine spark timing;
   vi) engine intake and exhaust valve timing;
   vii) engine intake and exhaust gas temperature; and
   viii) throttle position.

7. The method of claim 6 wherein said exhaust gas sensors includes at least one sensor selected from the group consisting of
   i) flame ionization detectors;
   ii) light absorption detectors including non-dispersive infrared detectors;
   iii) calorimetric sensors;
   iv) electron capture detectors;
   v) mass spectrometers;
   vi) Fourier Transform Infrared (FTIR) analyzers;
   vii) electrolytic sensors; and
   viii) electromagnetic sensors.

8. The method of claim 7 wherein said vehicle emission sensors include at least one sensor selected from the group consisting of
   i) oxygen sensors including EGO, HEGO and UEGO sensors;
   ii) hydrocarbon sensors;
   iii) calorimetric sensors;
   iv) Oxides of Nitrogen (NOx) sensors; and
   v) Hydrogen Sulfide ($H_2S$) sensors.

9. The method of claim 1 wherein said changing step is determined by the emissions and emission quantities sensed by exhaust gas sensors in said bench analyzer.

10. The method of claim 9 further including the step of thermally aging said catalytic converter after completing step (g) for a fresh catalytic converter.

11. The method of claim 10 wherein said catalyst has a precious metal at a set concentration, at least one oxygen storage material at a set concentration, a promoter at a set concentration, a stabilizer at a set concentration, a washcoat, a substrate and passages of a set wall thickness formed in the substrate and further including performing at least one step selected from the group consisting of i) changing the concentration of the precious metals in the washcoat of the catalytic converter;
ii) changing the oxygen storage materials;
iii) changing the concentration of any storage material;
iv) changing the promoters;
v) changing the concentration of any promoter;
iv) changing the stabilizers;
vii) changing the concentrations of any stabilizer;
Viii) changing the size of the catalytic converters;
ix) changing the density of the gas passages in the catalytic converter;
x) changing the geometric configuration of the gas passages in the catalytic converter; and
xi) changing the wall thickness of the substrate in the catalytic converter whereby the design criteria for the emission levels are met with a specific vehicle/calibration/catalytic converter combination and the cost of the total emission system is minimized.

12. The method of claim 11 wherein said catalytic converter system includes a close-coupled catalyst having a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components and optionally a second zirconium oxide; wherein the preferred composition is from about 75 to 400 g/ft3 of the palladium components; from about 0.75 to about 2.02 g/in3 of activated alumina support; from about 0.05 g/in3 to about 0.4 g/in3 of activated alumina support; from about 0.05 to about 0.2 g/in3 of barium oxide; and from about 0.05 to about 0.5 g/in3 of the second zirconium oxide; said method sequentially changing said preferred composition within said ranges.

13. The method of claim 11 wherein said catalytic converter system comprises at least one catalytic component and at least one oxygen storage component; at least one catalyst substrate wherein the catalyst is supported on said substrate and a layered catalyst composite comprising a first inner layer and a second outer layer wherein the first layer includes
 a first support;
 a first palladium component;
 optionally a first platinum group component;
 optionally at least one first stabilizer;
 optionally at least one first rare earth metal component; and
 optionally a zirconium compound; and
the second layer includes
 a second support;
 a second platinum component;
 a rhodium component;
 an oxygen storage composition comprising a diluted second oxygen storage component; and
 optionally a zirconium component;

and wherein the total amount of platinum component of the composite comprises from 50 to 100 weight percent based on platinum metal of the second platinum component based on the total of the first and second platinum components; and said method incrementally changing said platinum composition of said first component within said ranges.

14. The method of claim 13 wherein said catalytic converter system further includes a close-coupled catalyst having a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components and optionally a second zirconium oxide; wherein the preferred composition is from about 75 to 400 g/ft3 of the palladium components; from about 0.75 to about 2.02 g/in3 of activated alumina support; from about 0.05 g/in3 to about 0.4 g/in3 of activated alumina support; from about 0.05 to about 0.2 g/in3 of barium oxide; and from about 0.05 to about 0.5 g/in3 of the second zirconium oxide; said method incrementally changing said preferred composition within said ranges.

15. A method for achieving targeted concentrations of tailpipe emissions produced by an internal combustion engine equipped with at least one catalytic converter and an ECU for controlling the operation of the engine comprising the steps of:

a) providing i) a secondary controller for developing actuator signals for controlling a specific engine operation affecting emissions generated by the engine instead of the ECU, ii) an emission analyzer for generating control instructions inputted to the secondary controller which the secondary controller uses to develop the actuator signals, and iii) a bench gas analyzer for analyzing selected engine and tailpipe emission components which is inputted to the emission analyzer;

b) monitoring selected vehicle sensor signals generated by the vehicle during a specified drive cycle which affect the actuator signals to generate a control map having a control parameter correlated to a number of sensed engine operating conditions with the secondary controller additionally generating actuator signals for the range of control parameters recorded in the control map to replicate the ECU actuator signals whereby the secondary controller is able to interpolate the control map and duplicate the ECU actuator signals;

c) generating at least one emissions map by the emissions analyzer from emission data collected from the vehicle's sensors including emission sensors and the bench gas analyzer including bench emission sensors with the emissions map correlating the emissions with at least one engine operating parameter and the control parameter used in generating the control map;

d) modifying the control parameter values for those engine operating parameter values which produced maximum emissions in the emission map to reduce emissions;

e) changing the control parameter in the control map to the values set in the modified emission map;

f) inputting the modified control map to the secondary controller and repeating the drive cycle under control of secondary controller; and g) repeating steps c, d, e and f until emissions generated by the engine have reached desired levels.

16. The method of claim 15 wherein the control parameter is at least one parameter selected from the group consisting of i) A/F ratio,
ii) EGR mixed with the combustible air fuel mixture;
iii) engine spark timing;
iv) engine intake and exhaust valve timing; and
v) A/F ratio perturbation frequency.

17. The method of claim 16 wherein said engine operating parameter is at least one parameter selected from the group consisting of
   i) engine speed;
   ii) engine load;
   iii) mass air flow;
   iv) manifold absolute air pressure;
   v) engine spark timing;
   vi) engine intake and exhaust valve timing;
   vii) engine intake and exhaust gas temperature; and
   viii) throttle position.

18. The method of claim 17 wherein said exhaust gas sensors in said bench analyzer include at least one sensor selected from the group consisting of
   i) flame ionization detectors;
   ii) light absorption detectors including non-dispersive infrared detectors;
   iii) calorimetric sensors;
   iv) electron capture detectors;
   v) mass spectrometers;
   vi) Fourier Transform Infrared (FTIR) analyzers;
   vii) electrolytic sensors; and
   viii) electromagnetic sensors.

19. The method of claim 18 wherein said vehicle emission sensors includes at least one sensor selected from the group consisting of
   i) oxygen sensors including EGO, HEGO and UEGO sensors;
   ii) hydrocarbon sensors;
   iii) calorimetric sensors;
   iv) Oxides of Nitrogen (NOx) sensors; and
   v) Hydrogen Sulfide ($H_2S$) sensors.

20. The method of claim 19 wherein said modifying step d) includes identifying the operating condition ranges in the emission map whereat the emissions exceed a set limit and said changing step e) includes changing the control parameter values within set limits in the control map for the operating condition ranges detected in the emission map whereat the emissions exceeded the set limit.

21. The method of claim 20 whereat said changing step includes e) incrementally changing the control parameter within set limits.

22. The method of claim 20 wherein the control parameter is the A/F ratio, the bench gas analyzer includes a mass spectrometer measuring exhaust gases containing sulfur compounds, the operating conditions sensed in both emission and control maps include exhaust gas temperature, the emission map measuring the gaseous sulfur compounds sensed by the mass spectrometer whereby step g) produces a modified A/F ratio control map minimizing poisoning of the catalytic converters.

23. The method of claim 22 wherein the drive cycle includes a segment commencing with the cold start of the engine and continuing until the catalytic converter system becomes catalytically active and/or achieves light-off.

24. The method of claim 20 wherein the control parameter is the A/F ratio, the bench gas analyzer includes an FTIR measuring species of non-methane hydrocarbons in the exhaust gases, the operating conditions sensed in both emission and control maps including exhaust gas temperature and flow, the emission map measuring certain species of non-methane hydrocarbons sensed by the FTIR whereby step g) produces a modified A/F ratio control map minimizing the production by the engine of certain species of non-methane hydrocarbons.

25. The method of claim 24 further including the step of changing the precious metal concentration in the catalytic converter system to levels sufficient to cause reduction of the concentration of said certain species of hydrocarbons produced by the modified control map to set limits.

26. The method of claim 20 wherein said catalyst has a precious metal at a set concentration, at least one oxygen storage material at a set concentration, a promoter at a set concentration, a stabilizer at a set concentration, a washcoat a substrate and passages of a set wall thickness formed in the substrate and further including, after completion of step g),
   h) modifying the catalytic converter by performing at least one step selected from the group consisting of
      i) changing the concentration of the precious metals in the washcoat of the catalytic converter;
      ii) changing the oxygen storage materials;
      iii) changing the concentration of any storage material;
      iv) changing the promoters;
      v) changing the concentration of any promoter thereof;
      vi) changing the stabilizers;
      vii) changing the concentration of any stabilizer;
      viii) changing the size of the catalytic converters;
      ix) changing the density of the gas passages in the catalytic converter;
      x) changing the geometric configuration of the gas passages in the catalytic converter; and
      xi) changing the wall thickness of the substrate in the catalytic converter;
   i) generating the emission maps while conducting the drive cycle with actuator signals developed under the modified control map; and
   j) evaluating the emission maps to determine whether emission objectives have been met before incrementally modifying control parameters in the control map.

27. The method of claim 26 wherein said catalytic converter system includes a close-coupled catalyst having a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components and optionally a second zirconium oxide; wherein the preferred composition is from about 75 to 400 g/ft3 of the palladium components; from about 0.75 to about 2.02 g/in3 of activated alumina support; from about 0.05 g/in3 to about 0.4 g/in3 of activated alumina support; from about 0.05 to about 0.2 g/in3 of barium oxide; and from about 0.05 to about 0.5 g/in3 of the second zirconium oxide; said method incrementally changing said preferred composition within said ranges.

28. The method of claim 26 wherein said catalytic converter system comprises at least one catalytic component and at least one oxygen storage component; at least one catalyst substrate wherein the catalyst is supported on said substrate and a layered catalyst composite comprising a first inner layer and a second outer layer wherein
   the first layer includes
      a first support;
      a first palladium component;

optionally a first platinum group component;
optionally at least one first stabilizer;
optionally at least one first rare earth metal component; and
optionally a zirconium compound; and the second layer includes
a second support;
a second platinum component;
a rhodium component;
an oxygen storage composition comprising a diluted second oxygen storage component; and
optionally a zirconium component;

and wherein the total amount of platinum component of the composite comprises from 50 to 100 weight percent based on platinum metal of the second platinum component based on the total of the first and second platinum components; and said method incrementally changing said platinum composition of said first component within said ranges.

29. The method of claim 28 wherein said catalytic converter system further includes a close-coupled catalyst having a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components and optionally a second zirconium oxide; wherein the preferred composition is from about 75 to 400 g/ft3 of the palladium components; from about 0.75 to about 2.02 g/in3 of activated alumina support; from about 0.05 g/in3 to about 0.4 g/in3 of activated alumina support; from about 0.05 to about 0.2 g/in3 of barium oxide; and from about 0.05 to about 0.5 g/in3 of the second zirconium oxide; said method incrementally changing said preferred composition within said ranges.

30. A system for achieving targeted tailpipe emissions produced by an internal combustion engine having a catalytic converter system and an ECU for controlling the operation of said engine, said system comprising:
    a) a secondary controller for selectively controlling at least one engine operation in place of the ECU controlling said one engine operation, said ECU continuing to control all other engine operations; said secondary controller including i) means for monitoring vehicular sensor input signals and actuator signals generated by the ECU when controlling said one engine operation in response to said vehicular sensor input signals, ii) means to generate a control map from data acquired from said monitoring means which at any given time during a drive cycle correlates a control parameter for controlling said one engine operation in response to at least one selected vehicle sensor indicating a sensed operating condition of said engine, iii) means to generate an actuator signal controlling said one engine operation with said control parameter and iv) means for modifying said control map in response to instructions from an outside source;
    b) a bench gas analyzer having a plurality of gas sensors for sensing specific emission compounds in the engine and tailpipe exhaust and including timing means associated with said bench gas analyzer for correlating sensed emission compounds in the exhaust gas with specific drive cycle intervals as well as total emissions sensed during the drive cycle; and
    c) an emissions analyzer including a CPU and associated memory receiving vehicle sensor input signals and bench gas analyzer signals and generating map modification instructions to said secondary controller, said emissions analyzer including i) means to monitor said vehicle sensor signals to generate said control map; ii) means to generate at least one emission map from vehicle emission sensor data and bench gas analyzer data which at any given time during a drive cycle correlates sensed vehicle emissions with said control parameter and said at least one selected operating condition sensed by said vehicle sensor; iii) means to modify said control parameter in said control map at selected operating conditions where emissions recorded on said emission map exceed a set limit; and iv) means to input said modified control parameter map as instructions to said secondary controller's means for modifying.

31. The system of claim 30 wherein said catalytic converter systems includes at least one element selected from the group consisting of:
    i) adsorbers;
    ii) reactors;
    iii) catalytic converters;
    iv) particulate filters;
    v) particulate traps;
    vi) heat exchangers;
    vii) heaters; and,
    viii) exhaust stream additives.

32. The system of claim 30 wherein said emission analyzer's means to modify effects an incremental modification to said control parameter and
    d) said system further including means to cyclically repeat drive cycles during which said emission analyzer further modifies the modified control map generated in the previous cycle until desired emission levels are produced.

33. The system of claim 32 wherein the control parameter is at least one parameter selected from the group consisting of
    i) A/F ratio,
    ii) EGR mixed with the combustible air fuel mixture;
    iii) engine spark timing;
    iv) engine intake and exhaust valve timing; and
    v) A/F ratio perturbation frequency.

34. The system of claim 33 wherein said engine operating parameter is at least one parameter selected from the group consisting of
    i) engine speed;
    ii) engine load;
    iii) mass air flow and/or pressure;
    iv) manifold absolute air pressure;
    v) engine spark timing;
    vi) engine intake and exhaust valve timing;
    vi) engine intake and exhaust gas temperature; and
    viii) throttle position.

35. The system of claim 34 wherein said bench gas sensors includes at least one sensor selected from the group consisting of
    i) flame ionization detectors;
    ii) light absorption detectors including non-dispersive infrared detectors;
    iii) calorimetric sensors;
    iv) electron capture detectors;

v) mass spectrometers;

vi) Fourier Transform Infrared (FTIR) analyzers;

vii) electrolytic sensors; and viii) electromagnetic sensors.

36. The system of claim 35 wherein said vehicle emission sensors includes at least one sensor selected from the group consisting of i) oxygen sensors including EGO, HEGO and UEGO sensors;

ii) hydrocarbon sensors;

iii) calorimetric sensors;

iv) Oxides of Nitrogen (NOx) sensors; and v) Hydrogen Sulfide ($H_2S$) sensors.

37. The system of claim 36 wherein said catalytic converter system includes a close-coupled catalyst having a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components and optionally a second zirconium oxide; wherein the preferred composition is from about 75 to 400 g/ft3 of the palladium components; from about 0.75 to about 2.02 g/in3 of activated alumina support; from about 0.05 g/in3 to about 0.4 g/in3 of activated alumina support; from about 0.05 to about 0.2 g/in3 of barium oxide; and from about 0.05 to about 0.5 g/in3 of the second zirconium oxide; said emission analyzer modifying means incrementally changing said preferred composition within said ranges.

38. The system of claim 36 wherein said catalytic converter system comprises at least one catalytic component and at least one oxygen storage component; at least one catalyst substrate wherein the catalyst is supported on said substrate and a layered catalyst composite comprising a first inner layer and a second outer layer wherein the first layer includes
  a first support;
  a first palladium component;
  optionally a first platinum group component;
  optionally at least one first stabilizer;
  optionally at least one first rare earth metal component; and
  optionally a zirconium compound; and the second layer includes
  a second support;
  a second platinum component;
  a rhodium component;
  an oxygen storage composition comprising a diluted second oxygen storage component; and
  optionally a zirconium component;

and wherein the total amount of platinum component of the composite comprises from 50 to 100 weight percent based on platinum metal of the second platinum component based on the total of the first and second platinum components; and said emission analyzer's modifying means incrementally changing said platinum composition of said first component within said ranges.

39. The system of claim 38 wherein said catalytic converter system further includes a close-coupled catalyst having a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components and optionally a second zirconium oxide; wherein the preferred composition is from about 75 to 400 g/ft3 of the palladium components; from about 0.75 to about 2.02 g/in3 of activated alumina support; from about 0.05 g/in3 to about 0.4 g/in 3 of activated alumina support; from about 0.05 to about 0.2 g/in3 of barium oxide; and from about 0.05 to about 0.5 g/in3 of the second zirconium oxide; said emission analyzer's modifying means incrementally changing said preferred composition within said ranges.

* * * * *